United States Patent
Yoda et al.

(10) Patent No.: US 7,022,409 B2
(45) Date of Patent: Apr. 4, 2006

(54) PLEOCHROISM POWDER AND PLEOCHROISM PRINTED ARTICLE

(75) Inventors: Yukie Yoda, Kanagawa (JP); Kenichi Sakuma, Kanagawa (JP); Masayoshi Wada, Kanagawa (JP); Asa Kimura, Kanagawa (JP)

(73) Assignee: Shiseido Co., Ltd., Tokyo (JP)

( * ) Notice: Subject to any disclaimer, the term of this patent is extended or adjusted under 35 U.S.C. 154(b) by 574 days.

(21) Appl. No.: 10/161,649

(22) Filed: Jun. 5, 2002

(65) Prior Publication Data

US 2003/0108722 A1    Jun. 12, 2003

Related U.S. Application Data

(63) Continuation-in-part of application No. 09/533,108, filed on Mar. 22, 2000, now abandoned.

(30) Foreign Application Priority Data

Mar. 23, 1999   (JP)   .................................. 11-77998

(51) Int. Cl.
 *B32B 7/02* (2006.01)
(52) U.S. Cl. ...................... 428/404; 428/403; 428/570; 106/145
(58) Field of Classification Search ................ 428/570, 428/404, 403; 106/145
See application file for complete search history.

(56) References Cited

U.S. PATENT DOCUMENTS

| | | | |
|---|---|---|---|
| 3,087,827 A | | 4/1963 | Klenke, Jr., et al. |
| 3,087,828 A | * | 4/1963 | Linton .......................... 106/417 |
| 3,926,659 A | | 12/1975 | Bernhard et al. |
| 4,818,614 A | * | 4/1989 | Fukui et al. ................. 428/403 |
| 5,223,034 A | | 6/1993 | Nitta et al. |
| 5,223,360 A | * | 6/1993 | Prengel et al. ................. 430/39 |
| 5,298,076 A | | 3/1994 | Babler |
| 5,320,796 A | | 6/1994 | Harashima et al. |
| 5,540,769 A | | 7/1996 | Franz et al. |
| 5,643,672 A | | 7/1997 | Marchi et al. |
| 5,693,134 A | * | 12/1997 | Stephens ...................... 106/415 |
| 5,759,255 A | | 6/1998 | Venturini et al. |
| 6,107,244 A | * | 8/2000 | Zeira et al. ................. 503/201 |
| 6,129,784 A | | 10/2000 | Ikuta et al. |
| 6,150,026 A | | 11/2000 | Furuya et al. |

(Continued)

FOREIGN PATENT DOCUMENTS

EP    0 256 417    2/1988

(Continued)

OTHER PUBLICATIONS

DATABASE WPI, Section Ch, Week 199533, Derwent Publications, Ltd., AN 1995-252438, XP00219147, JP 07-157687, Jun. 20, 1995.

(Continued)

*Primary Examiner*—Bruce H. Hess
*Assistant Examiner*—Tamra L. Dicus
(74) *Attorney, Agent, or Firm*—Snider & Associates; Ronald R. Snider

(57) ABSTRACT

A multi color changing powder with a bluish base appearance color of which color tone varies according to the observation direction is provided. A pleochroism powder of the present invention comprises a flaky mica having a coating which consists of two layers wherein one of said two layers is a first layer comprising a metal oxide of titanium coated on said flaky mica and the other is a second layer comprising metal oxides of cobalt and aluminum coated on said first layer.

15 Claims, 13 Drawing Sheets

U.S. PATENT DOCUMENTS 6,238,471 B1    5/2001    Vogt et al.

FOREIGN PATENT DOCUMENTS

| EP | 0 971 246 A1 | 1/2000 |
| GB | 974 874 A | 11/1964 |
| JP | 59-126468 A | 7/1984 |
| JP | 07-157686 A | 6/1995 |
| JP | 07-157687 A | 6/1995 |
| JP | 11-279433 A | 10/1999 |

OTHER PUBLICATIONS

DATABASE WPI, Section Ch, Week 199533, Derwent Publications, Ltd., AN 1995-252437, XP002197148, JP 07-157686, Jun. 20, 1995.

Japanese Patent Office, Patent Abstracts of Japan, vol. 017, No. 030, Jan. 20, 1993, JP 04-249584 A, Sep. 4, 1992.

* cited by examiner

○ Solid Phase Method (a)

○ Liquid Phase Method (Urea Method)

(b)

○ Sodium Hydroxide Neutralizing Decomposition Method (c)

(a)

(b)

(a)

(b)

(a)

(b)

(a)

(b)

PLEOCHROISM POWDER AND PLEOCHROISM PRINTED ARTICLE

RELATED APPLICATIONS

This application claims the priority of Japanese Patent Application No. 11-77998 filed on Mar. 23, 1999, which is incorporated herein by reference. This application is Continuation-In-Part of U.S. patent application Ser. No. 09/533,108 filed on Mar. 22, 2000 now abandoned.

FIELD OF THE INVENTION

The present invention relates to a pleochroism powder and a pleochroism printed article and, in particular, to an improvement of the color tone thereof.

BACKGROUND OF THE INVENTION

Titanium oxide coated mica pigment is known to produce interference color. And it has been widely used as a pearl pigment. A colored pigment is coexisted thereto sometimes in order to give a specific color tone. However, such colored pigment is generally inferior in light resistance. Therefore some colored pigments (e.g., Japanese Examined Patent Publication No. 4-61032) have been developed to solve such a problem. A colored pigment which obtains a colored appearance by reducing a part of a titanium dioxide layer in titanium oxide coated mica pigment to give a dark lower titanium oxide and emphasize the interference color has been developed. Such inorganic colored pigments have the advantages in chemical stability and light resistance.

Also, in addition to a specific beautiful color tone, the pigment is required to have various functions in recent year. For example, the pigment which can easily obtain multi color changing property that gives different color tone according to the observation angle is attractive in view of obtaining the article that is difficult to duplicate by color copy.

However, the ordinary pigments only can be observed with the same color tone in general even if the color tone is observed from every direction. Also, even if the interference substance is compounded to a pigment powder, the powder can only obtain color changing property in the degree that the interference color is observed to some extent according to the observing direction.

SUMMARY OF THE INVENTION

The present invention is achieved in view of the foregoing problems of the prior art. An object of the present invention is to provide a multi color changing powder of which color tone changes according to the observing direction.

In order to achieve the foregoing object, a pleochroism powder according to the first aspect of the present invention is provided which comprises a flaky mica having a coating which consists of two layers, wherein one of said two layers is a first layer comprising a metal oxide of titanium coated on said flaky mica and the other is a second layer comprising metal oxides of cobalt and aluminum coated on said first layer.

It is preferable that the first layer of said pleochroism powder essentially consists of titanium dioxide.

Also, it is preferable that the second layer of said pleochroism powder essentially consists of cobalt aluminate.

Also, cobalt titanate is preferably comprised near the interface of the first layer and second layer. In this case, the cobalt titanate is formed by calcinating a composition comprising titanium dioxide coated mica, a cobalt compound and an aluminum compound.

Also, a mole ratio of said metal oxides is preferably 50 to 91.5% of titanium dioxide, 7.5 to 49% of cobalt and 1 to 20% of aluminum, and is also preferably 50 to 96.5% of titanium dioxide, 2.5 to 7.5% of cobalt and 1 to 47.5% of aluminum, and is also preferably 50 to 72.5% of titanium dioxide, 7.5 to 30% of cobalt and 20 to 42.5% of aluminum, and is also preferably 50 to 98% of titanium dioxide, 1 to 2.5% of cobalt and 1 to 49% of aluminum. Also, hue of an appearance color of the pleochroism powder is preferably within a range: a: −31.13 to 11.35; b: −29.46 to 31.22; and L: 30.82 to 88.23 wherein L, a, b values are values reported using a standard Hunter L, a, b color scale.

According to the second aspect of the present invention, a pleochroism powder is provided comprising a mixture of a titanium dioxide coated flaky mica which generates a reflected interference color, and a pigment or a dye having a color which is substantially complementary color to said reflected interference color.

It is preferable that said reflected interference color is gold and said pigment or a dye has a blue color, preferably cobalt blue. Also, the pigment or a dye is preferably in the amount of 2.5~30.0 wt % with respect to the amount of the titanium dioxide coated mica.

Also, according to the present invention, a pleochroism printed article is provided which comprises a base material and a layer of a composition coated on the surface thereof, said composition comprising the pleochroism powder according to the first aspect of the present invention, and wherein different colors of said pleochroism printed article are observed by changing the observation angle of incident light.

Also, said base material preferably has a color included in a set of gray scale colors that ranges from white to black, and also preferably has a blue color. Also, thickness of said layer of the composition is preferably 5 μm or more.

Also, according to the present invention, a pleochroism printed article is provided which comprises a base material and a layer of a composition coated on the surface thereof, said composition comprising the pleochroism powder according to the second aspect of the present invention, and wherein different colors of said pleochroism printed article are observed by changing the observation angle of incident light.

Also, according to the present invention, a pleochroism printed article is provided which comprises a base material, a layer of a first composition coated on the surface of said base material, and a layer of a second composition coated on the surface of said layer of the first composition, said first composition comprising titanium dioxide coated mica which generates a reflected interference color and said second composition comprising a pigment or a dye having substantially complementary color to reflection interference color of said titanium dioxide coated mica, and wherein different colors of said pleochroism printed article are observed by changing the observation angle of incident light.

BEST MODE FOR CARRYING OUT THE INVENTION

First Aspect of the Present Invention

As a result of diligent studies performed by the present inventors, it was found that a powder having an excellent color tone and multi color changing property can be obtained according to the first aspect of the present invention, that is, a pleochroism powder which comprises a flaky mica having a coating which consists of two layers, wherein one of said two layers is a first layer comprising a metal oxide of titanium coated on said flaky mica and the other is a second layer comprising metal oxides of cobalt and aluminum coated on said first layer.

Mica used in the present invention may be any kind of mica. Muscovite mica that is commercially available is used in general. However, biotite and the like can also be used. A particle diameter of mica is not restricted in particular. However, among mica that are commercially available, a mica which has small particle diameter and which is flat as much as possible, is preferable in order to give a powder of the present invention a beautiful color tone and nacreous luster. Accordingly, a particle diameter of mica is preferably 1 μm to 150 μm and more preferably 5 μm to 60 μm.

On the surface of mica particle, a metal oxide of titanium is coated to form a first layer (inner coated layer), and metal oxides of cobalt and aluminum are coated on the surface of the first layer to form a second layer (outer coated layer). In a preferable embodiment, the first layer essentially consists of titanium dioxide and the second layer essentially consists of cobalt aluminate.

Figure 1:
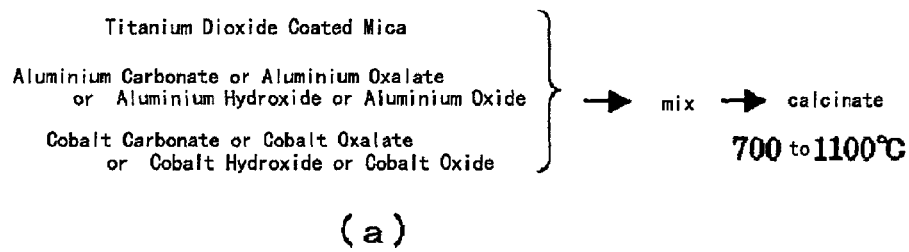
FIGS. 1(a), (b) and (c) are explanatory views showing synthesizing methods of a pleochroism powder according to the first aspect of the present invention.
Figure 1:
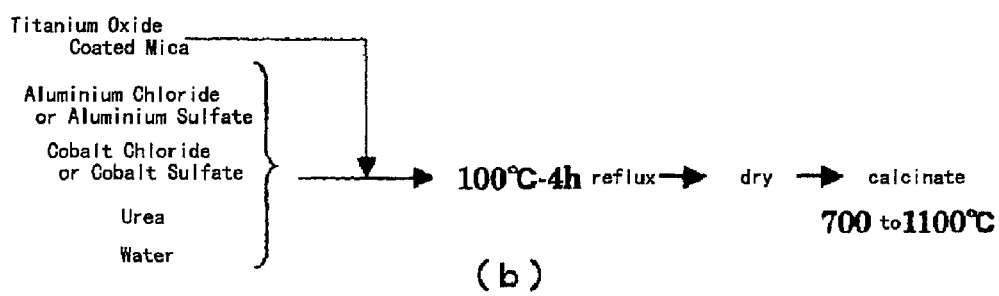
Figure 1:
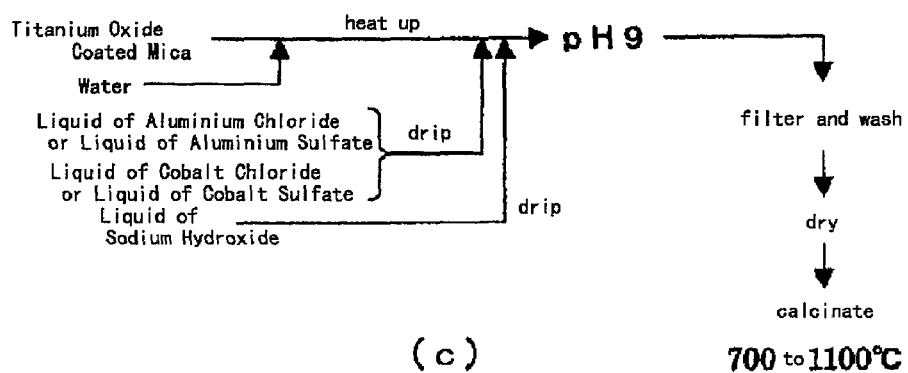

A pleochroism powder of the present invention can be manufactured by various methods in which metal oxides of cobalt and aluminum are coated on titanium dioxide coated mica. Three kinds of methods: solid phase method; liquid phase method (urea method) and sodium hydroxide neutralizing decomposition method are illustrated in FIG. 1.

In solid phase method, a powder of the present invention is produced according to the procedure shown in FIG. 1(a). Namely, cobalt compounds such as cobalt carbonate, cobalt oxalate, cobalt hydroxide and cobalt oxide and aluminum compounds such as aluminum carbonate, aluminum oxalate, aluminum hydroxide and aluminum oxide are mixed with titanium dioxide coated mica. The mixture is calcinated at 700° C. to 1100° C., thereby yielding a powder of the present invention.

In liquid phase method, a powder of the present invention is produced according to the procedure shown in FIG. 1(b). Namely, aluminum chloride or aluminum sulfate, cobalt chloride or cobalt sulfate, urea and water are mixed and titanium dioxide coated mica is added thereto. After refluxing and drying the mixture for 4 hours at 100° C., the resultant is calcinated at 700° C. to 1100° C., thereby yielding a powder of the present invention.

In sodium hydroxide neutralizing decomposition method, a powder of the present invention is produced according to the procedure shown in FIG. 1(c). Namely, titanium dioxide coated mica is dispersed into water and the solution is heated up to approximately 80° C. After dripping aluminum chloride or aluminum sulfate and cobalt chloride or cobalt sulfate thereto, sodium hydroxide is further dripped thereto so as to adjust pH to 9. After the solution is filtered, washed with water, and dried, the resultant is calcinated at 700° C. to 1100° C., thereby yielding a powder of the present invention.

Also, in the manufacturing method of FIG. 1(c), a powder of the present invention can also be obtained by using the other steps. Namely, sodium hydroxide is dripped to a titanium dioxide coated mica-dispersed water that is heated up to approximately 80° C. so as to adjust pH to 9, while aluminum chloride or aluminum sulfate and cobalt chloride or cobalt sulfate are dripped thereto simultaneously.

In the method set forth above, it is arbitrary whether a cobalt compound is coated after coating an aluminum compound or an aluminum compound is coated after coating a cobalt compound. A combination of the materials such as cobalt carbonate, cobalt oxalate, cobalt hydroxide, cobalt oxide, cobalt chloride or cobalt sulfate and aluminum carbonate, aluminum oxalate, aluminum hydroxide, aluminum oxide, aluminum chloride or aluminum sulfate is not restricted in particular. Further, each method such as solid phase method, liquid phase method and sodium hydroxide neutralizing decomposition method as set forth above may be combined in the case where aluminum and cobalt are coated separately.

The powder of the present invention can be obtained by coating an aluminum compound and a cobalt compound onto the surface of titanium dioxide coated mica and then calcinating it at 700° C. to 1100° C. Therefore, the manufacturing method is not restricted to the method indicated herein and it is possible to obtain by various methods to coat an aluminum compound and a cobalt compound on the surface of titanium dioxide coated mica.

In the case where an aluminum compound and a cobalt compound are coated separately, they form separate layers. But these two layers become one composite oxide layer by calcination.

Figure 2:
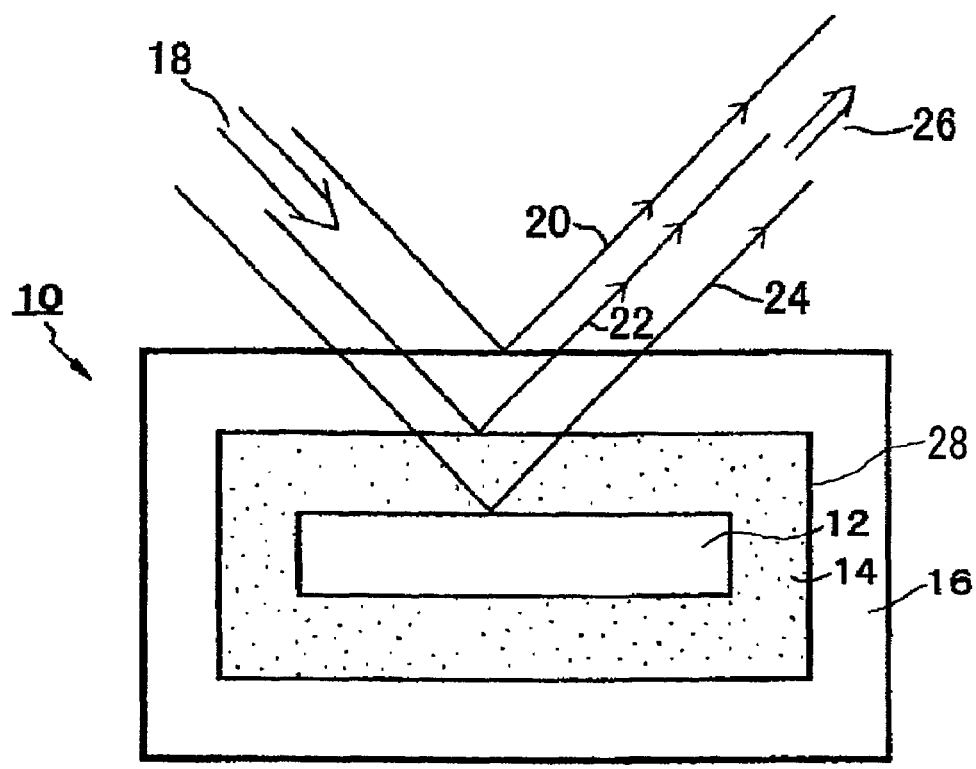
FIG. 2 is a typical view of a pleochroism powder particle according to the first aspect of the present invention.

A typical view of a pleochroism powder particle produced by the methods as set forth above is shown in FIG. 2. As shown in FIG. 2, mica 12 exists in the center of the pleochroism powder particle 10. A titanium dioxide layer 14 is formed on the outer periphery of mica 12 and a Co—Al composite oxide layer 16 is formed on the outer periphery of the titanium dioxide layer 14.

The Color Appearance of the Powder

It was found that a pleochroism powder of the present invention having the construction set forth above give various color appearances according to the ratio of titanium dioxide, aluminum and cobalt.

In the case where the mole ratio of the metal oxides is 50 to 91.5% of titanium dioxide, 7.5 to 49% of cobalt and 1 to 20% of aluminum, the appearance color of the powder is yellow green. This corresponds to that a is −20.00 to 5.00, b is 0 to 30.00 and L is 40.00 to 70.00 in case of converting the color by Lab of Hunter.

Also, in the case where the mole ratio of the metal oxides is 50 to 96.5% of titanium dioxide, 2.5 to 7.5% of cobalt and 1 to 47.5% of aluminum, the appearance color of the powder is blue. This corresponds to that a is −20.00 to 5.00, b is −30.00 to −8.00 and L is 50.00 to 80.00 in case of converting the color by Lab of Hunter.

Also, in the case where the mole ratio of the metal oxides is 50 to 72.5% of titanium dioxide, 7.5 to 30% of cobalt and 20 to 42.5% of aluminum, or the mole ratio of the metal oxides is 50 to 98% of titanium dioxide, 1 to 2.5% of cobalt and 1 to 49% of aluminum the appearance color of the powder is green to blue green. This corresponds to that a is − 20.00 to 5.00, b is −8.00 to 0 and L is 40.00 to 85.00 in case of converting the color by Lab of Hunter.

These results are shown in Table 1 as follows.

TABLE 1

| Appearance Color | $TiO_2$ | Co | Al |
| --- | --- | --- | --- |
| Yellow Green | 50%–91.5% | 7.5%–49% | 1%–20% |
| Blue | 50%–96.5% | 2.5%–7.5% | 1%–47.5% |
| Green to | 50%–72.5% | 7.5%–30% | 20%–42.5% |
| Blue Green | 50%–98% | 1%–2.5% | 1%–49% |

Figure 3:
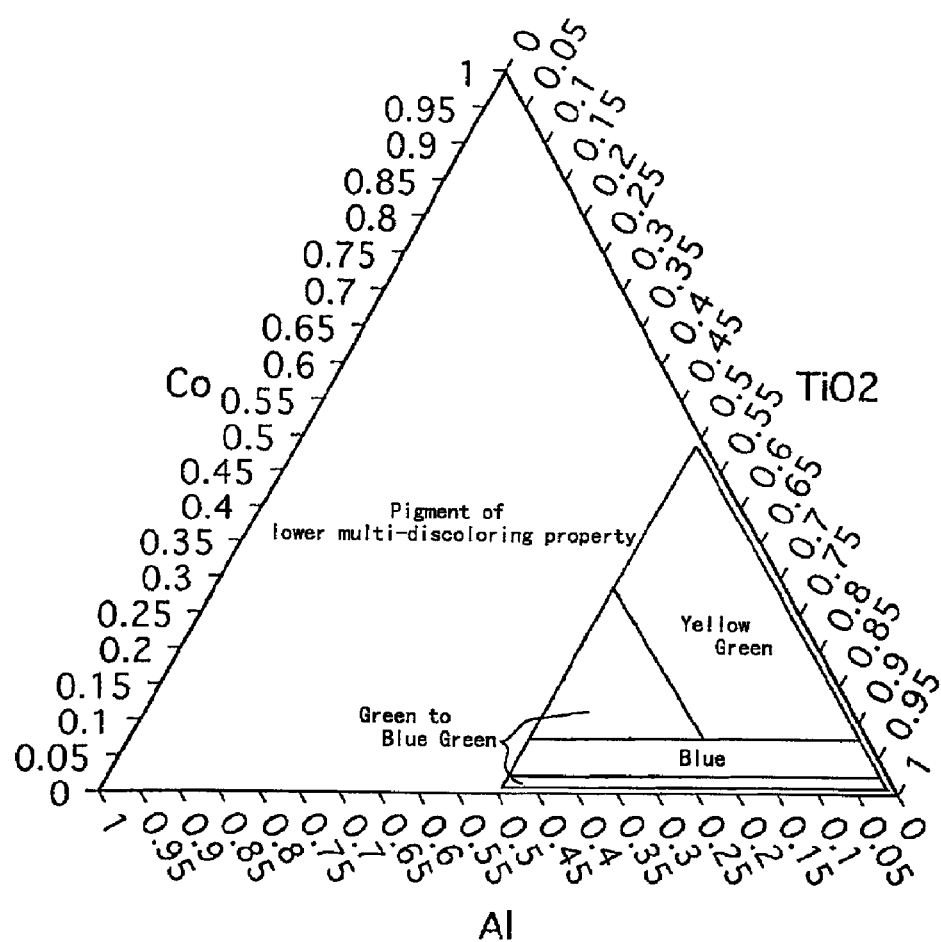
FIG. 3 is an explanatory view showing the relationship between a ratio of the metals to be compounded and color tone of the pleochroism powder according to the first aspect of the present invention.

Further, Table 1 is shown schematically in FIG. 3. As shown in FIG. 3, the appearance color whose color tone is in the range of yellow green to blue can be obtained by changing the ratio of $TiO_2$, Al and Co. The appearance color is changed in the range of bluish color by changing the ratio of $TiO_2$, Al and Co.

A powder of the present invention is produced via calcination as set forth hereinbefore. Under the process of calcination, cobalt aluminate as a Co—Al composite oxide is formed in the layer 16 of FIG. 2. Also, near the interface 28 of titanium dioxide layer 14 and cobalt aluminate layer 16, where Ti exists close to Co and Al, a composite oxide of Ti, Co and Al, such as cobalt titanate, is formed under calcination, although not as a layer like the layer 14 and 16. Accordingly, cobalt titanate coexists with the other metal oxides near the interface 28.

Superior bluish appearance of a powder according to the present invention is caused from the layer 16 wherein cobalt aluminate, which is a cause of bluish color, is comprised. However, as set forth above, cobalt titanate which is also a cause of blue color exists near the interface 28. Therefore, further emphasized blue appearance can be obtained by coexisting bluish color of cobalt titanate with that of cobalt aluminate.

Figure 13:
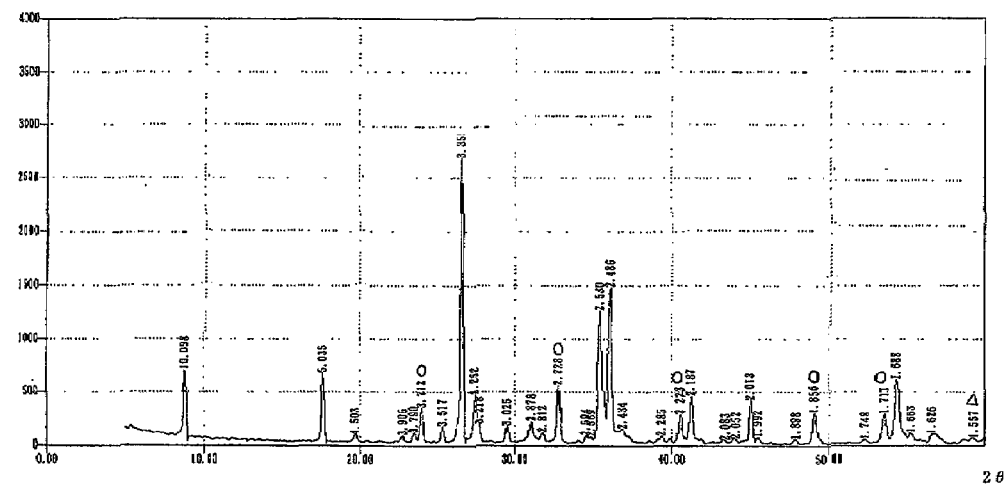
FIG. 13(a) is an X-ray diffraction pattern of a pleochroism powder according to the first aspect of the present invention.
FIG. 13(b) is that of a titanium dioxide coated mica.
Figure 13:
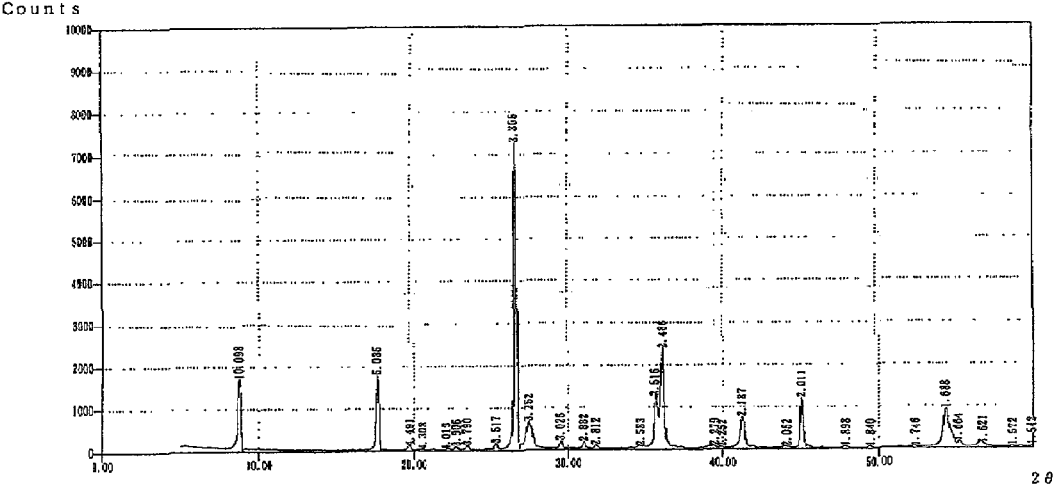

In FIG. 13(a) an X-ray diffraction pattern of a powder of the present invention, which is obtained by coating Al and Co compound on the surface of titanium dioxide coated mica and then calcinating, is shown. It is confirmed that there appears some peaks of cobalt titanate and cobalt alminate, as well as those of the titanium dioxide coated mica (As a comparison, an X-ray diffraction pattern of the titanium dioxide coated mica is shown in FIG. 13(b)).

Multi Color Changing Property of the Powder

A powder of the present invention shows characteristic property that the color changes according to the viewing angle. A multi color changing property shown by the powder of the present invention is explained with referring to FIG. 2 again.

As set forth above, mica 12 exists in the center of the powder particle 10. Titanium dioxide layer 14 is formed on the outer periphery of mica 12 and a Co—Al composite oxide layer 16 is formed on the outer periphery of the titanium dioxide layer 14.

When white light 18 is irradiated to the powder particle 10, a part of white light 18 reflects on the surface of the Co—Al composite oxide layer 16 and becomes a reflected light 20. The reflected light 20 gives the color tone of the appearance color that the powder of the present invention have fundamentally.

White light 18 which does not reflect on the surface of the Co—Al composite oxide layer 16 advances to the inside of the powder particle 10 and produces a reflected light on the surfaces of titanium dioxide layer 14 and mica 12 by a large difference of refractive index. Then, the reflected light 22 of the titanium dioxide layer 14 and the reflected light 24 of the surface of mica 12 produce a reflected interference light 26 which has a specific color tone according to the optical path difference due to the layer thickness of the titanium dioxide layer 14.

Accordingly, the color tone that the powder particle 10 have fundamentally by the reflected light 20 is observed from the angle that the reflected interference light 26 can not be observed. On the other hand, the color that the reflected interference light 26 and the general reflected light 20 are mixed is observed from the angle that the reflected interference light 26 can be observed.

It is characteristic in the present invention that the Co—Al composite oxide layer 16 has extremely high transparency and hardly influences on the reflected interference light 26. Also, the powder of the present invention can obtain multi color changing property by various color tones by combining the appearance color and the color tone of the reflected interference light 26, because the color of the reflected interference light 26 can be controlled by adjusting the layer thickness of the titanium dioxide layer 14 coated on the surface of mica 12.

In the case where a ratio of metal oxides is not within the range mentioned above, multi color changing property may become inferior to the case where a ratio of metal oxides is within the range. However, it is possible enough to use such powder as a pigment because it has beautiful glossiness and color tone.

Stability and Constitution of the Powder

Cobalt aluminate forming a most outer layer of the powder particle is stable to the undiluted acid and undiluted alkali and has excellent heat resistance. Also, cobalt aluminate is capable of giving the multi color changing property to the powder by combining with the reflected interference color of titanium dioxide coated mica, because the cobalt aluminate has a high transparent property and is high colorfulness blue pigment.

It is better to avoid preparing a layer of lower refractive index in comparison with the refractive index of titanium dioxide layer 14 between the titanium dioxide layer 14 and the Co—Al composite oxide layer 16. This is because in such a case there are a possibility that the thickness of the titanium dioxide layer which is optically adjusted may be changed when such a low refractive index layer is inserted thereto, which may cause an unpreferable change of the reflected interference color. Also, there is a possibility that a chroma of the reflected interference color may be reduced in such a case.

Also, it is preferable that titanium dioxide is coated directly on mica surface and Co—Al composite oxide is coated on the surface of titanium dioxide coating layer. In the case where Co—Al composite oxide is coated directly on mica surface and titanium dioxide is coated on the surface of Co—Al composite oxide coating layer, remarkable bad influence is exerted to the multi color changing property without the reflected interference color is generated well.

As mentioned above, the pleochroism powder according to the first embodiment of the present invention has characteristics to be excellent in light resistance, stability to time passing and chemical stability since the powder is covered with Co—Al composite oxide.

Second Aspect of the Present Invention

The second aspect of the present invention, a pleochloism powder in which titanium dioxide coated mica and a pigment or a dye are mixed is provided. This pleochroism powder shows a remarkable color change by using a pigment or a dye having a color tone of substantially complementary color to the reflected interference color of the titanium dioxide coated mica. The wording "complementary color" herein means that defined in the Japanese Industrial Standards. Also, to manufacture this pleochroism powder is easy. Further this pleochroism powder has the light resistance and stability to time passing sufficiently by choosing a pigment or a dye admixed therein.

Various known methods can be used to mix titanium dioxide coated mica and a pigment or a dye.

In the present invention, It is preferable to use titanium dioxide coated mica which generates the reflected interference color of a gold color tone, since the bright and strong interference light is obtained. At this time, it is preferable to use a pigment or a dye having a blue color tone in the relation of the complementary color to a gold color tone. In this case it is preferable to admix cobalt blue for obtaining a high multi color changing property. Admixing amount of a pigment or a dye such as cobalt blue is preferably 2.5 to 30.0 wt % with respect to the amount of the titanium dioxide coated mica for obtaining such a property.

A Pleochroism Printed Article

According to the present invention, A pleochroism printed article in which a composition comprising the above pleochroism powder is coated onto a base material is provided. A coating composition in which a pleochroism powder is contained in a proper amount is preferably used when the pleochroism powder is applied onto the base material. In this case the amount of the pleochroism powder to be compounded into the coating composition is not restricted in particular because the amount depends on the other materials such as binder and solvent compounded in the composition. However, it is generally preferable that the amount is 5 to 35 wt % with respect to the whole amount of the composition. Hiding power is reduced if the amount of the pleochroism powder is small. Also, if the amount of the pleochroism powder is too much, dispersion of the pleochroism powder in the composition becomes heterogeneously, which may cause the appearance of the coated material to become spotted. Also, viscosity of the composition may come to rise, which sometimes causes unfavorable influence on workability and printability.

Though the coating composition is not restricted in particular, the compositions comprising a binder resin, a solvent and the like are preferably used. The binder resin can stick the pleochroism powder on the surface of the coated base material in stable. After applying the coating composition on a base material, the binder resin forms a film on the base material with the solvent in the composition volatilized and the pleochroism powder embedded. The binder resin is not restricted in particular since the binder resin is selected according to compatibility with the base material, film strength of a forming film, film pressure and the like. For example, the binder resin generally used for the coating material or printing ink can be used. Examples of the binder include gilsonite, maleic resin, cyclorubber, hardened rosin, petroleum resin, nitrocellulose, acrylic resin, polyurethane resin, chlorinated polypropylene, vinyl chloride-vinyl acetate copolymer resin, ethylene-vinyl acetate copolymer resin, vinyl chloride, polyester resin, alkyd resin, linseed oil, modified phenol resin, fumaric resin, epoxy ester resin, epoxy amino resin, epoxy phenol resin, polyester resin, vinyl resin, polyamide resin, petroleum varnish, ketone resin, chlorinated rubber, ethyl cellulose, urea resin, melamine resin and the like.

Also, as a solvent compounded together with a pleochroism powder of the present invention, usually used solvents in coating material or ink can be used. The solvent is not restricted in particular as long as the solvent can favorably dissolve the binder resin and improve its workability, and also can satisfactory disperse and compound the pleochroism powder into the resin solution. Examples of the solvent include toluene, xylene, n-hexane, cyclohexane, methyl acetate, ethyl acetate, isopropyl acetate, n-propyl acetate, n-butyl acetate, isobutyl acetate, methanol, ethanol, n-propyl alcohol, isopropyl alcohol, n-butyl alcohol, isobutyl alcohol, acetone, methyl ethyl ketone, methyl isobutyl ketone, propylene glycol monomethyl ether, ethylene glycol monomethyl acetate, ethylene glycol monoethyl ether, ethylene glycol monoethyl ether acetate and the like. A volatile organic solvent is mainly used as the solvent. Water and the like may be compounded as the solvent.

In addition to the ingredients mentioned above, various additives that are usually compounded into coating material or ink may be compounded in the coating composition within the range that the effect of the present invention is not spoiled, so as to adjust the properties of the composition. For example, plasticizers, waxes, humectants, stabilizers, dyes, antistatic agents, anti-forming agents, antioxidants, leveling agents, polymerization inhibitors, fillers and the like are listed.

As the base material to be coated by the coating composition, paper, paperboard, cloth, leather, metal, plastic or the like is listed. However, it is not restricted thereto in particular. Also, various shapes thereof may be applicable as the base material. The base material may be processed with applying, printing or coating, in advance.

In order to obtain a high brilliant impression and an excellent color tone, a weight ratio between the pleochroism powder in the coating composition and the binder resin is preferably 1:20 to 3.5:10. When such a coating composition is applied onto the base material, the solvent in the composition is volatilized by drying and a binder resin film is formed on the base material. The pleochroism powder is held into the film, thereby forming a coating film. Accordingly, in the coating film on the base material, the weight ratio between the pleochroism powder and the binder resin may also within the range of 1:20 to 3.5:10. The coating film having such a ratio provides the coated material with favorable color appearance and high brilliant impression.

Also, as a color tone of the base material to be coated with the coating composition, it is preferable to be within gray scale of white to black achromatic color or blue of yellow green to indigo blue on the point that multi color changing property of the pleochroism powder is sufficiently appeared. For the same reason a thickness of the coated layer of the coating composition on the base material is preferably 5 μm or more.

The coating composition may be coated onto a part or a whole part of the surface of the base material. A method for applying the coating composition onto the base material includes a general application method, printing method or coating technology. Examples of the printing method include letterpress printing, intaglio printing, gravure printing, screen printing, flexo printing, offset printing, ink jet printing, electrostatic printing and the like. Also, the application method such as brush application, spray coating, drum coating, stencil application, electrostatic coating, flow coating, dip coating, roller coating or spray coating can be used.

In the case where the powder is replaced with a pleochloism powder according to the second aspect of the present invention, excellent properties as set forth above can also be obtained. Namely, a pleochroism printed article produced by coating a composition comprising the pleochroism powder according to the second aspect of the present invention onto the base material also shows excellent color changing property which shows the different color tone by changing the observation angle to incident light.

Also, the pleochroism printed article produced by the following method is provided. Namely, a first composition comprising titanium dioxide coated mica which generates reflected interference color is coated onto a base material. Then a transparent colored second composition comprising a pigment or a dye that have a color tone of substantially complementary color to reflection interference color of the titanium dioxide coated mica is coated onto the coated layer of the first composition. The pleochroism printed article obtained by the above procedure also shows excellent color changing property which shows the different color tone by changing the observation angle to incident light.

Concrete examples of the present invention will be shown in the following, though the invention should not be limited thereto.

EXAMPLES

Example 1

A pleochroism powder in accordance with one example of the present invention was manufactured according to the process shown in FIG. 1(c). 1 liter of water was added to 100.00 parts by weight of titanium dioxide coated mica, and the solution was stirred and dispersed. 11.89 parts by weight of cobalt chloride hydrate ($CoCl_2 \cdot 6H_2O$) and 72.27 parts by weight of aluminum sulfate hydrate ($Al_2(SO_4)_3 \cdot 14H_2O$) were dissolved to water so as to make an aqueous solution. The latter was dripped down to the former and the mixture was heated up to 80° C. while stirring. 2 mol/liter of sodium hydroxide solution was further dripped down thereto and pH of the solution was adjusted to 9. Thus formed metal oxide coated mica was filtered and washed with water. After drying it for 12 hours at 150° C., it was calcinated for 1 hour at 900° C.

In the resulting powder, mole ratio of the composite oxide was 67.6% of titanium dioxide, 4.7% of cobalt and 27.7% of aluminum. Also, the appearance color was light blue and the interference color was yellow.

Example 2

A pleochroism powder in accordance with one example of the present invention was manufactured according to the process shown in FIG. 1(c). 1 liter of water was added to 100.00 parts by weight of titanium dioxide coated mica in which the content of titanium dioxide (i.e., the layer thickness of titanium dioxide coated on mica) was different from Example 1, and the solution was stirred and dispersed. 12.10 parts by weight of cobalt chloride hydrate ($CoCl_2 \cdot 6H_2O$) and 73.53 parts by weight of aluminum sulfate hydrate ($Al_2(SO_4)_3 \cdot 14H_2O$) were dissolved to water so as to make an aqueous solution. The latter was dripped down to the former and the mixture was heated up to 80° C. while stirring. 2 mol/liter of sodium hydroxide solution was further dripped down thereto and the pH of the solution was adjusted to 9. Thus formed metal oxide coated mica was filtered and washed with water. After drying it for 12 hours at 150° C., it was calcinated for 1 hour at 900° C.

Though the layer thickness of titanium dioxide of the resulting powder was different from Example 1, the mole ratio of composite oxide was same with Example 1, i.e., mole ratio of the composite oxide was 67.6% of titanium dioxide, 4.7% of cobalt and 27.7% of aluminum. Also, the appearance color was light blue and the interference color was red.

Example 3

A pleochroism powder in accordance with one example of the present invention was manufactured according to the process shown in FIG. 1(c). 1 liter of water was added to 100.00 parts by weight of titanium dioxide coated mica in which the content of titanium dioxide (i.e., the layer thickness of titanium dioxide coated on mica) was different from Example 1, and the solution was stirred and dispersed. 14.18 parts by weight of cobalt chloride hydrate ($CoCl_2 \cdot 6H_2O$) and 86.22 parts by weight of aluminum sulfate hydrate ($Al_2(SO_4)_3 \cdot 14H_2O$) were dissolved to water so as to make an aqueous solution. The latter was dripped down to the former and the mixture was heated up to 80° C. while stirring. 2 mol/liter of sodium hydroxide solution was further dripped down thereto and the pH of the solution was adjusted to 9. Thus formed metal oxide coated mica was filtered and washed with water. After drying it for 12 hours at 150° C., it was calcinated for 1 hour at 900° C.

Though the layer thickness of titanium dioxide of the resulting powder was different from Example 1 and 2, the mole ratio of composite oxide was same with Example 1 and 2, i.e., mole ratio of the composite oxide was 67.6% of titanium dioxide, 4.7% of cobalt and 27.7% of aluminum. Also, the appearance color was light blue and the interference color was green.

Example 4

A pleochroism powder in accordance with one example of the present invention was manufactured according to the process shown in FIG. 1(c). 1 liter of water was added to 100.00 parts by weight of titanium dioxide coated mica in which the content of titanium dioxide (i.e., the layer thickness of titanium dioxide coated on mica) was different from Example 1, and the solution was stirred and dispersed. 8.91 parts by weight of cobalt chloride hydrate ($CoCl_2 \cdot 6H_2O$) and 54.21 parts by weight of aluminum sulfate hydrate ($Al_2(SO_4)_3 \cdot 14H_2O$) were dissolved to water so as to make an aqueous solution. The latter was dripped down to the former and the mixture was heated up to 80° C. while stirring. 2 mol/liter of sodium hydroxide solution (NaOH) was further dripped down thereto and the pH of the solution was adjusted to 9. Thus formed metal oxide coated mica was filtered and washed with water. After drying it for 12 hours at 150° C., it was calcinated for 1 hour at 900° C.

In the resulting pleochroism powder, mole ratio of the composite oxide was 73.5% of titanium dioxide, 3.9% of cobalt and 22.6% of aluminum. Also, the appearance color was light blue and the interference color was yellow.

Example 5

A pleochroism powder in accordance with one example of the present invention was manufactured according to the process shown in FIG. 1(c). 1 liter of water was added to 100.00 parts by weight of titanium dioxide coated mica in which the content of titanium dioxide (i.e., the layer thickness of titanium dioxide coated on mica) was different from Example 1, and the solution was stirred and dispersed. 5.95 parts by weight of cobalt chloride hydrate ($CoCl_2 \cdot 6H_2O$) and 36.14 parts by weight of aluminum sulfate hydrate ($Al_2(SO_4)_3 \cdot 14H_2O$) were dissolved to water so as to make an aqueous solution. The latter was dripped down to the former and the mixture was heated up to 80° C. while stirring. 2 mol/liter of sodium hydroxide solution was further dripped down thereto and the pH of the solution was adjusted to 9. Thus formed metal oxide coated mica was filtered and washed with water. After drying it for 12 hours at 150° C., it was calcinated for 1 hour at 900° C.

In the resulting pleochroism powder, mole ratio of the composite oxide was 80.7% of titanium dioxide, 2.8% of cobalt and 16.5% of aluminum. Also, the appearance color was light blue and the interference color was yellow.

Example 6

A pleochroism powder in accordance with one example of the present invention was manufactured according to the process shown in FIG. 1(a). 100.00 parts by weight of titanium dioxide coated mica in which the content of titanium dioxide (i.e., the layer thickness of titanium dioxide coated on mica) was same with Example 1, 8.16 parts by weight of cobalt oxide (CoO) and 24.19 parts by weight of aluminum oxide ($Al_2O_3$) were mixed and the mixture was calcinated for 1 hour at 900° C.

In the resulting pleochroism powder, mole ratio of the composite oxide was 55.6% of titanium dioxide, 12.2% of cobalt and 32.2% of aluminum. Also, the appearance color was blue green and the interference color was yellow.

Example 7

A pleochroism powder in accordance with one example of the present invention was manufactured according to the process shown in FIG. 1(b). 1 liter of water, 25.91 parts by weight of cobalt chloride hydrate ($CoCl_2 \cdot 6H_2O$), 27.37 parts by weight of aluminum sulfate hydrate ($Al_2(SO_4)_3 \cdot 14H_2O$) and 44.8 parts by weight of urea were dissolved so as to make an aqueous solution. 100.00 parts by weight of titanium dioxide coated mica in which the content of titanium dioxide (i.e., the layer thickness of titanium dioxide coated on mica) was same with Example 1 was added thereto and the mixture was heated up to 100° C. and refluxed for 4 hours. Thus formed metal oxide coated mica was filtered and washed with water. After drying it for 12 hours at 150° C., it was calcinated for 1 hour at 900° C.

In the resulting pleochroism powder, mole ratio of the composite oxide was 60.0% of titanium dioxide, 27.5% of cobalt and 12.5% of aluminum. Also, the appearance color was yellow green and the interference color was yellow.

Example 8

A pleochroism powder in accordance with one example of the present invention was manufactured according to the process shown in FIG. 1(c). Namely, 1 liter of water was added to 100.00 parts by weight of titanium dioxide coated mica and the solution was heated up to 80° C. while stirring and dispersing. 11.89 parts by weight of cobalt chloride hydrate ($CoCl_2 \cdot 6H_2O$) and 72.27 parts by weight of aluminum sulfate hydrate ($Al_2(SO_4)_3 \cdot 14H_2O$) were dissolved to water so as to make an aqueous solution. The latter was dripped down to the former. On the other hand, 2 mol/liter of sodium hydroxide solution was simultaneously dripped down thereto while adjusting the pH of the solution to 9 until the mixed solution of cobalt chloride hydrate and aluminum sulfate hydrate was used up. Thus formed metal oxide coated mica was filtered and washed with water. After drying it for 12 hours at 150° C., it was calcinated for 1 hour at 900° C.

In the resulting pleochroism powder, mole ratio of the composite oxide was 67.6% of titanium dioxide, 4.7% of cobalt and 27.7% of aluminum. Also, the appearance color was light blue and the interference color was yellow.

Then, the present inventors studied the special properties shown by a pleochroism powder of the present invention.

Experiment 1

It was found that the color tone of a base material have an important role to show a sufficient color appearance property when a coating composition in which a pleochroism powder of the present invention was compounded was coated on the base material. This is because the appearance color and the interference color of the pleochroism powder are hindered and weakened according to the color tone of the base material, which is caused by high transparency of the pleochroism powder. Thereupon, the present inventors have studied the relationship between the base material color and the color changing degree.

First, 4.5 parts by weight of nitrocellulose as a binder resin and 10.5 parts by weight of a solvent which is composed of 10 to 20% of butyl acetate, 5 to 10% of xylene, 5 to 10% of ethyl acetate, 5 to 10% of methyl ethyl ketone and 30 to 40% of toluene were mixed, and 4 parts by weight of the pleochroism powder of Example 1 having light blue appearance color and yellow interference color was added and dispersed thereto so as to form a coating composition. Thus obtained coating composition is referred to as Preparation 1.

Second, the equivalent amount of the binder resin and the solvent, which are same with Preparation 1, were mixed, and 4 parts by weight of the pleochroism powder of Example 2 having light blue appearance color and red interference color was added and dispersed thereto so as to form a coating composition. Thus obtained coating composition is referred to as Preparation 2.

These Preparations 1 and 2 were printed on colored paper substrates each having different color by a screen printing (thickness of printed layer: 110 μm). Colorimetry of these Preparations was conducted by a goniospectrophotometer and a color change degree was measured.

Figure 4:
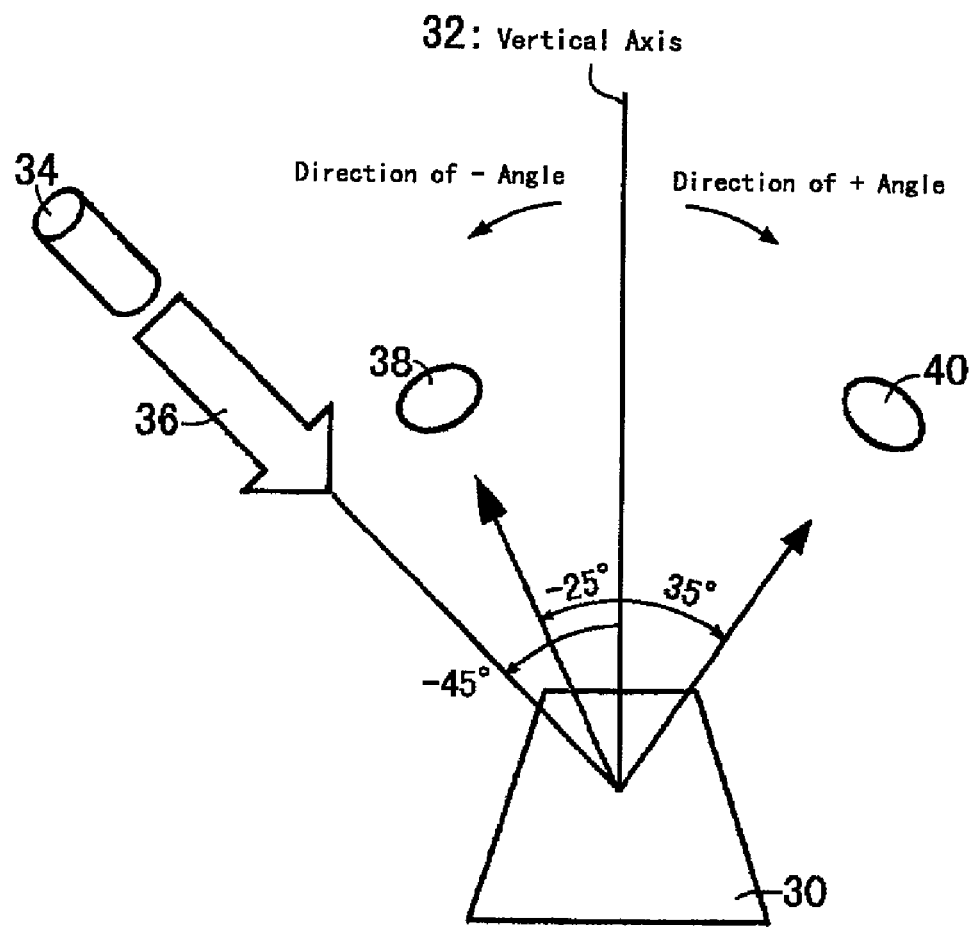
FIG. 4 is an explanatory view of the method for measuring a color change degree of a pleochroism powder according to the first aspect of the present invention.

An explanatory view of a method for measuring the color changing degree of the pleochroism powder is shown in FIG. 4. As shown in FIG. 4, a vertical axis 32 with respect to a measuring object 30 made by printing on a colored paper with the coating composition in which the pleochroism powder was compounded was determined to be standard. White light 36 was irradiated from a direction of −45° with a white light source 34, and the light received by a light receiver 38 and 40, which were arranged at −25° and 35°, respectively, were measured. The value of colorimetry was converted to Lab of Hunter and evaluated thereby.

The reason why the light at −25° and 35° was measured is as follows. Only the appearance color can be observed at −25° with substantially no influence by the interference color of the pleochroism powder. Also, a mixed color of the appearance color and the interference color can be observed at 35° because the interference color of the pleochroism powder strongly appears at this angle. Accordingly, it can be judged that the color change degree is larger if the color difference observed at these two points is larger.

A part of the results of measurement is shown in Table 2 (Preparation 1) and Table 3 (Preparation 2), respectively. Also, ab views of Table 2 is shown in FIG. 5(a) and that of Table 3 is shown in FIG. 5(b), respectively.

Figure 5:
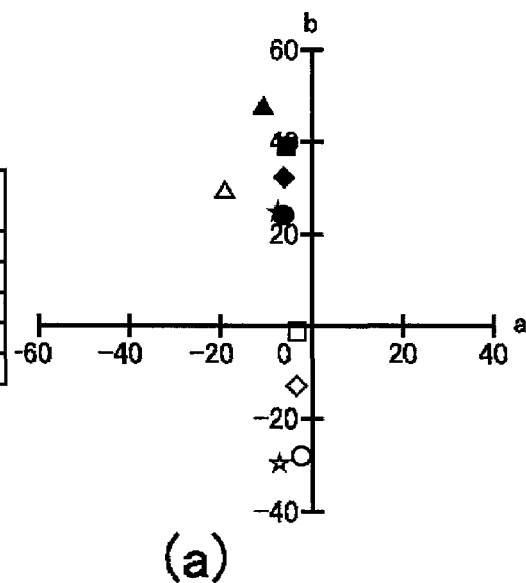
FIGS. 5(a) and (b) are ab views showing the result of measuring a color change degree of a pleochroism powder according to the first aspect of the present invention, respectively.
Figure 5:
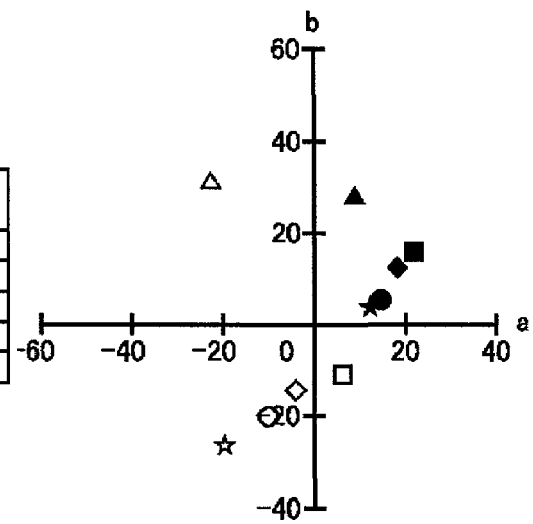

As shown in Table 2, FIG. 5(a), Table 3 and FIG. 5(b), it is understood that the different color tone is observed according to the substrate color even if each pleochroism powder show the same color appearance. It is also understood that multi color changing property is also influenced by the substrate color.

However, it is clearly understood from FIGS. 5(a) and (b) that the difference between the colorimetry values received at −25° and 30° is large and color changing property is high when the substrate color is within gray scale of white to black achromatic color. It is also understood that the difference of the colorimetry values is large and color changing property is high when the substrate color is light blue that is the same color with the appearance color of the powder. In this case, it is also understood that the observed appearance color becomes clearer since the substrate color of light blue influences on the appearance color of the pleochroism powder and synergistic effect is performed.

Accordingly, it is preferable that the color tone of the substrate is within gray scale of white to black achromatic color or blue of yellow green to indigo blue that is similar color with the appearance color of the pleochroism powder. In both cases, it is preferable that the effects of the pleochroism powder are appeared satisfactory.

To the contrary, if the color of a substrate was different from those mentioned above, the color of the substrate overcomes the appearance color and the interference color of the pleochroism powder and spoils color changing property thereof. As such an example, the case where the substrate color is lemon is shown in Table 2, FIG. 5(a), Table 3 and FIG. 5(b). It is clearly understood from FIGS. 5(a) and (b) that the difference of the values of colorimetry which are received at −25° and 35° is small and color changing property of the powder is hindered.

Experiment 2

The present inventors have further studied the relationship between the application thickness and the color change degree of the coating composition in which the pleochroism powder of the present invention is compounded.

Preparation 1 was coated to the substrate of which color was within gray scale by a doctor blade with film thickness changed in each case. In the similar manner to Experiment

TABLE 2

| Color of Substrate | Color of Substrate | | | −25° Light Receiving | | | 35° Light Receiving | | |
|---|---|---|---|---|---|---|---|---|---|
| Substrate | L | a | b | L | a | b | L | a | b |
| White | 87.70 | 2.94 | −5.56 | 61.77 | −2.48 | −28.06 | 125.06 | −6.23 | 24.19 |
| Black | 18.53 | 0.11 | −0.60 | 44.97 | −3.20 | −1.01 | 118.82 | −5.61 | 38.92 |
| Gray | 53.99 | −1.77 | 1.41 | 52.85 | −3.32 | −12.91 | 121.47 | −6.01 | 32.62 |
| Lemon | 87.74 | −13.91 | 51.26 | 62.78 | −18.96 | 29.63 | 126.50 | −10.61 | 47.74 |
| Light Blue | 67.31 | −18.81 | −23.24 | 56.94 | −7.04 | −29.30 | 122.42 | −7.40 | 25.08 |

TABLE 3

| Color of Substrate | Color of Substrate | | | −25° Light Receiving | | | 35° Light Receiving | | |
|---|---|---|---|---|---|---|---|---|---|
| Substrate | L | a | b | L | a | b | L | a | b |
| White | 87.7 | 2.94 | −5.56 | 69.62 | −10.02 | −20.23 | 117.16 | 14.65 | 5.43 |
| Black | 18.53 | 0.11 | −0.60 | 36.56 | 6.50 | −11.02 | 100.14 | 21.78 | 15.79 |
| Gray | 53.99 | −1.77 | 1.41 | 51.64 | −3.94 | −14.39 | 108.67 | 18.15 | 12.39 |
| Lemon | 87.74 | −13.91 | 51.26 | 66.01 | −22.53 | 31.35 | 111.31 | 8.85 | 28.16 |
| Light Blue | 67.31 | −18.81 | −23.24 | 60.98 | −19.32 | −26.24 | 112.71 | 12.29 | 3.99 |

1, white light was irradiated from a direction of −45° as shown in FIG. 4. The values of colorimetry that were received at −25° and 35° were converted to Lab of Hunter. The color change degree was calculated with the distance between −25° and 30° by making ab view therefrom. It was confirmed that the color tone of the powder was not so much influenced by the substrate color when the film thickness is thickened.

Figure 6:
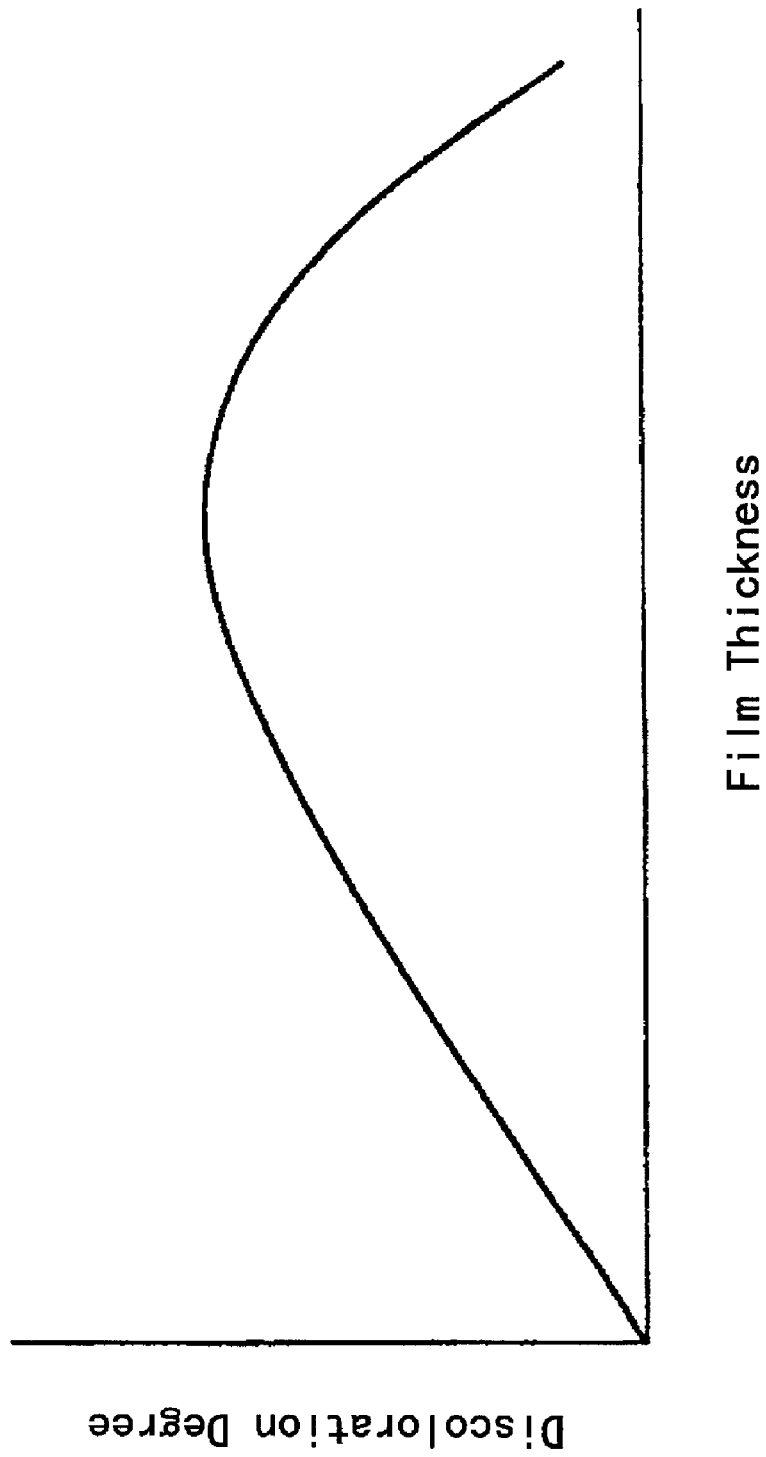
FIG. 6 is an explanatory view of the relationship between a film thickness and a color change degree of a coating composition comprising a pleochroism powder according to the first aspect of the present invention.

The relationship between the color change degree and the film thickness is shown in FIG. 6. As shown in FIG. 6, the color change degree becomes large continuously as the film thickness becomes to thicken if the film thickness is not extremely thickened. As a result of experiment, a favorable color change degree is observed when the substrate color is within the range of white to L:31.83 a: −0.01 b: 1.86 if the coating thickness is thinner than 30 μm. On the other hand, in the case where the coating thickness is 30 μm or more, high color change degree was obtained within the whole range of white to black with no influence of the substrate color.

Accordingly, it is preferable that the coating thickness of the coating composition in which the pleochroism powder of the present invention is compounded is within the ordinary range of the film thickness, i.e., 5 μm or more and more preferably 20 μm or more. It is further preferable that the coating thickness is 30 μm or more. In this case, it is possible to obtain the color change degree which is not influenced by the substrate color.

As a result of Experiments 1 and 2, it is understood as follows. If the color tone of the base material to be coated by the coating composition in which the pleochroism powder of the present invention is compounded is not within gray scale of white to black achromatic color and blue of yellow green to indigo blue, it is preferable to paint the color of the base material to give such a color in advance by paint, colors or the other coloring means. Also it is preferable to apply the coating composition to the base material with a coating thickness of 30 μm or more.

Experiment 3

Next, Preparation 1 was coated on substrates having white or gray color with film thickness of the coated film being 30 μm, respectively. The white color substrate on which the film of Preparation 1 was formed is referred to as Preparation 3 and the gray color substrate on which the film of Preparation 1 was formed is referred to as Preparation 4. In the similar manner to the measurement method shown in FIG. 4, white light was irradiated to these Preparations 3 and 4, respectively, from a direction of −45°. Wavelength distribution of the reflected light at −25° and 35° was measured. As a Comparative object, the binder resin and the solvent those are same with those of Preparation 1 were mixed to titanium dioxide coated mica which was used in Example 1 under the condition that cobalt aluminate is not coated thereto. Comparative Preparation 1 was prepared by coating the mixture onto a substrate of white color with the same film thickness as Preparations 3 and 4. Wavelength distribution of the reflected light at −25° and 35° is shown in FIGS. 7(a) and (b), respectively.

Figure 7:
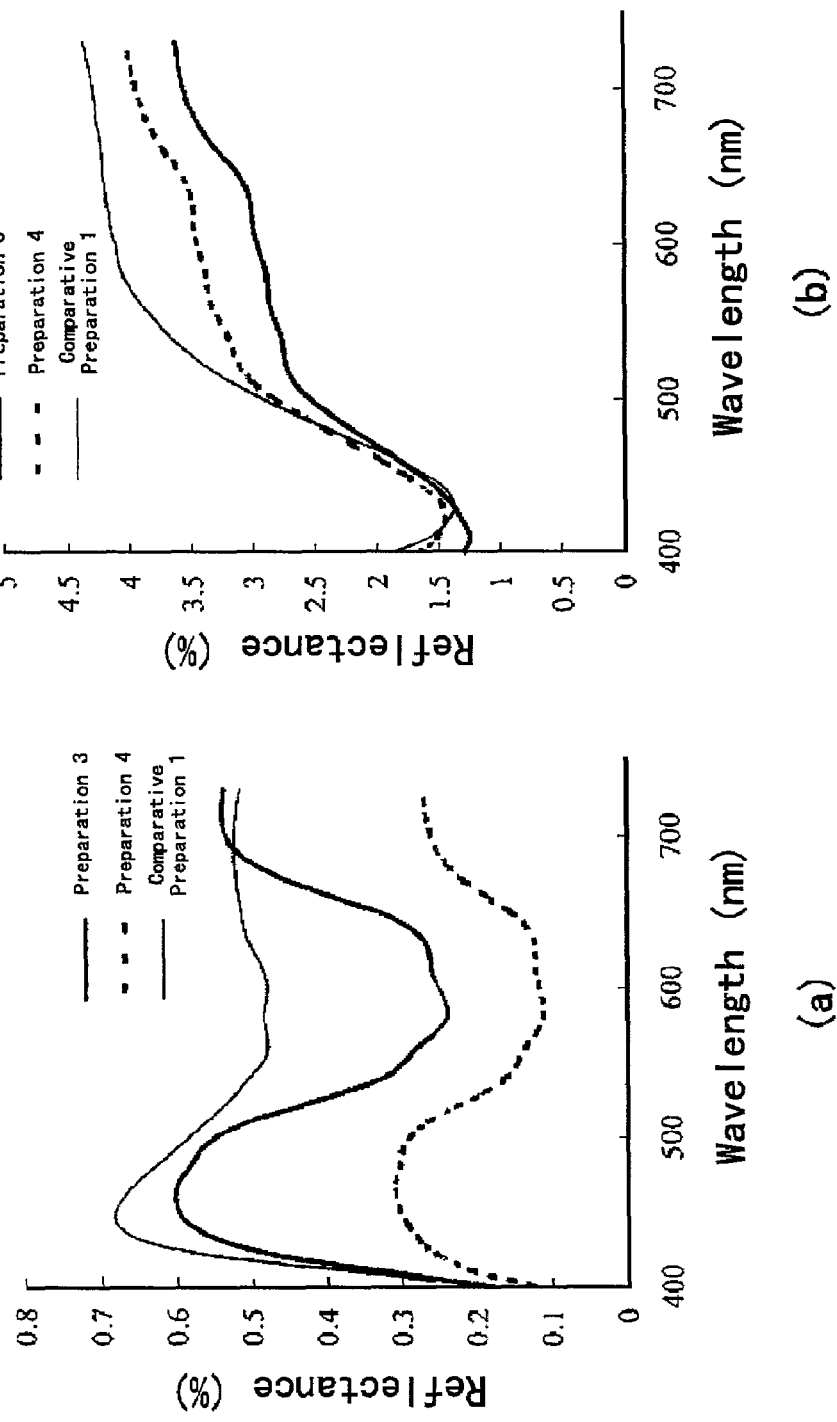
FIGS. 7(a) and (b) are views of wavelength distribution of the reflected light from the base material coated with a composition comprising a pleochroism powder according to the first aspect of the present invention (Example 1).

As shown in FIG. 7(a), wherein wavelength distribution at −25° from which only the appearance color of the pleochroism powder is observed and almost no interference color was detected is shown, the reflectance of short-wavelength side was high, while the reflectance of long-wavelength side was low in both Preparations 3 and 4. It was also found that the difference between the reflectance of short-wavelength side and the reflectance of long-wavelength side was extremely large. To the contrary, Comparative Preparation 1 in which titanium oxide coated mica was coated had high reflectance in short-wavelength side and low reflectance in high-wavelength side. It was also found that the difference between reflectance of short-wavelength side and reflectance of long-wavelength side was not so much large and its appearance looked whity on the whole.

As shown in FIG. 7(b), wherein wavelength distribution at 35° from which the mixed color of the appearance color and the interference color of the pleochroism powder is observed and the interference color was strongly detected is shown, the reflectance of short-wavelength side was low, while the reflectance of long-wavelength side was high in both Preparations 3 and 4. It was also found that the difference between the reflectance of short-wavelength side and the reflectance of long-wavelength side was extremely large. Comparative Preparation 1 in which titanium oxide coated mica was coated had low reflectance in short-wavelength side and high reflectance in long-wavelength side.

As shown in these FIGS. 7(a) and (b), both Preparations 3 and 4 changed from bluish color to yellow to orange by changing an observation angle. The color change degree was extremely high even when the color was observed with naked eye. To the contrary, though Comparative Preparation 1 changed from whity to yellow to orange by changing an observation angle, it was difficult to observe the color change with naked eye since the color change degree was low.

Experiment 4

Preparation 1 was coated on a substrate having white color with the film thickness of the coated film being 30 μm. The white color substrate on which the film of Preparation 1 was formed is referred to as Preparation 5. Also, Example 4 or 5, which has the same appearance color and interference color with Example 1 and has different ratio of $TiO_2$, Co and Al, was mixed with the binder resin and the solvent which were same with those used for producing Preparation 1, respectively. The mixture was coated on a substrate having white color with the thickness of the coated film being same with Preparation 5. The white color substrate on which the film comprising Example 4 is referred to as Preparation 6 and the white color substrate on which the film comprising Example 5 was formed is referred to as Preparation 7.

In the similar manner to the measurement method shown in FIG. 4, white light was irradiated to these Preparations 5 to 7, respectively, from a direction of −45°. The reflected light was received at an angle from −25° to 60° at intervals of 5°. The color change degree was studied by converting the value of colorimetry by Lab of Hunter. The results are shown in Table 4.

TABLE 4

| Light Receiving Angle | Preparation 5 | | | Preparation 6 | | | Preparation 7 | | |
|---|---|---|---|---|---|---|---|---|---|
| | L | a | b | L | a | b | L | a | b |
| −25 | 64.56 | −1.95 | −26.73 | 66.22 | −2.91 | −23.93 | 67.95 | −2.00 | −21.59 |
| −20 | 64.99 | −2.05 | −26.34 | 66.71 | −3.05 | −23.49 | 68.41 | −2.14 | −21.17 |
| −15 | 65.45 | −2.17 | −25.81 | 67.34 | −3.13 | −22.72 | 69.00 | −2.24 | −20.55 |
| −10 | 66.17 | −2.18 | −24.95 | 68.25 | −3.27 | −21.57 | 69.82 | −2.30 | −19.55 |
| −5 | 67.225 | −2.33 | −23.55 | 69.55 | −3.27 | −19.91 | 71.07 | −2.40 | −17.99 |
| 0 | 68.90 | −2.50 | −21.50 | 71.47 | −3.38 | −17.49 | 73.03 | −2.58 | −15.58 |
| 5 | 71.37 | −2.69 | −18.36 | 74.45 | −3.58 | −13.76 | 76.08 | −2.86 | −11.84 |
| 10 | 75.18 | −2.98 | −13.60 | 78.75 | −3.81 | −8.50 | 80.52 | −3.28 | −6.51 |
| 15 | 80.92 | −3.49 | −6.64 | 85.10 | −4.23 | −1.04 | 87.11 | −3.84 | 1.16 |
| 20 | 88.97 | −4.18 | 2.61 | 93.72 | −4.89 | 8.43 | 96.29 | −4.77 | 11.13 |
| 25 | 100.78 | −5.30 | 14.68 | 106.05 | −5.75 | 20.26 | 109.49 | −6.14 | 23.68 |
| 30 | 117.52 | −6.56 | 28.06 | 122.83 | −6.60 | 32.00 | 127.09 | −7.55 | 36.16 |
| 35 | 147.35 | −7.63 | 39.33 | 153.43 | −7.16 | 41.33 | 159.76 | −8.25 | 45.49 |
| 40 | 192.56 | −6.34 | 42.63 | 192.93 | −5.77 | 43.32 | 203.88 | −6.57 | 46.16 |
| 45 | 21.06 | −5.21 | 39.15 | 216.92 | −5.37 | 42.34 | 210.65 | −5.67 | 41.80 |
| 50 | 201.96 | −6.77 | 42.98 | 190.84 | −6.40 | 42.98 | 196.14 | −7.50 | 45.97 |
| 55 | 159.08 | −9.15 | 39.99 | 155.38 | −8.32 | 39.45 | 157.67 | −9.41 | 42.73 |
| 60 | 129.36 | −9.27 | 31.28 | 128.52 | −8.53 | 31.14 | 130.30 | −9.12 | 33.85 |
| 65 | 115.51 | −8.73 | 22.85 | 116.00 | −8.30 | 23.46 | 117.74 | −8.55 | 25.84 |

As is clear from Table 4, it is understood that the observed color of Preparations 5 to 7 was changed by the observation angle as shown in that the Lab value is changed according to the increase of angle from −25°. In particular, if the color change degree is determined as the difference with the value at −25°, the largest color change degree was observed in the vicinity of 45°, and that the color returned to the former color when the angle was increased 45° or more.

Experiment 5

Preparation 1 was coated on a substrate having white or gray color with film thickness of the coated film being 30 μm, respectively. The white color substrate on which the film of Preparation 1 was formed is referred to as Preparation 8 and the gray color substrate on which the film of Preparation 1 was formed is referred to as Preparation 9.

Also, Example 2 or 3, which has the same appearance color and different interference color with Example 1 and has the same ratio of TiO₂, Co and Al, was mixed with the binder resin and the solvent which were same with those used for producing Preparation 1, respectively. The mixture was coated on a substrate having white or gray color with the thickness of the coated film being same with Preparation 8 and 9. The white color substrate on which the film comprising Example 2 was formed, the gray color substrate on which the film comprising Example 2 was formed, the white color substrate on which the film comprising Example 3 was formed, and the gray color substrate on which the film comprising Example 3 was formed is referred to as Preparations 10, 11, 12 and 13, respectively.

In the similar manner to the measuring method of Experiment 4 as shown in FIG. 4, the color range degrees of Preparations 8 to 13 were studied. White light was irradiated from a direction of −45° and the reflected light was received at an angle from −25° to 65° at intervals of 5°. The color change degree was studied by converting the value of colorimetry by Lab of Hunter.

Figure 8:
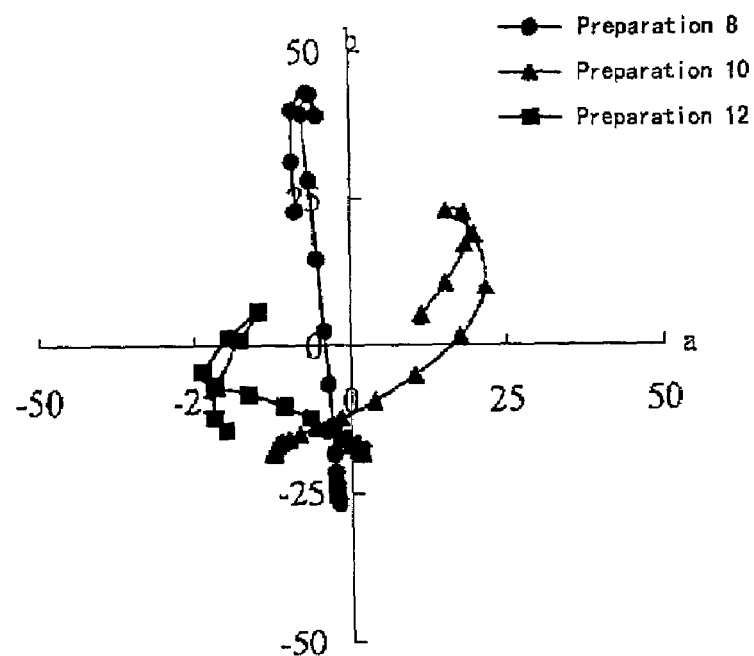
FIGS. 8(a) and (b) are ab views showing the result of Tables 5 and 6, respectively.
Figure 8:
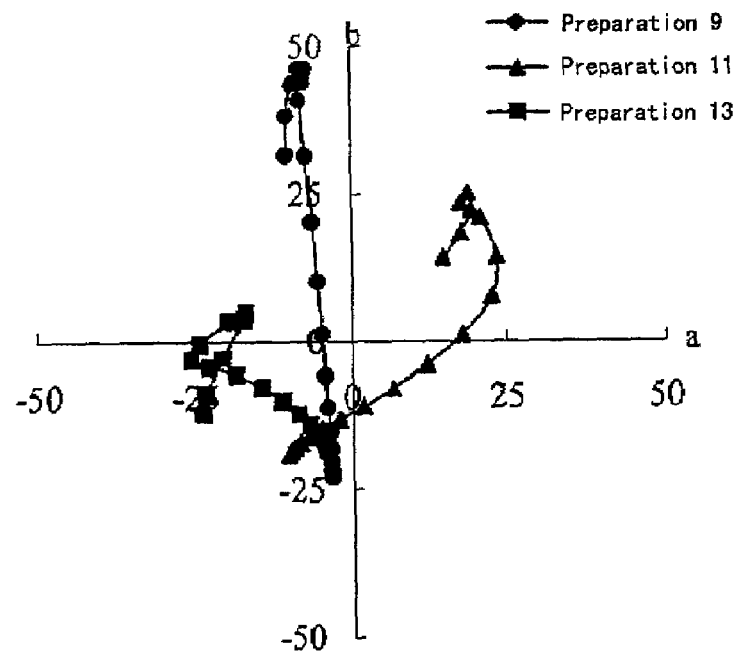

The result of Preparations 8, 10 and 12 whose substrate color is white and the result of Preparations 9, 11 and 13 whose substrate color is gray is shown in Tables 5 and 6, respectively. Also, ab views of Tables 5 and 6 is shown in FIGS. 8(a) and (b), respectively.

TABLE 5

| Light Receiving Angle | Preparation 8 | | | Preparation 10 | | | Preparation 12 | | |
|---|---|---|---|---|---|---|---|---|---|
| | L | a | b | L | a | b | L | a | b |
| −25 | 64.56 | −1.95 | −26.73 | 70.20 | −12.47 | −18.28 | 66.75 | 1.57 | −18.30 |
| −20 | 64.99 | −2.05 | −26.34 | 70.52 | −12.44 | −17.78 | 66.89 | 1.66 | −18.30 |
| −15 | 65.45 | −2.17 | −25.81 | 70.80 | −12.22 | −17.34 | 67.11 | 1.63 | −18.19 |
| −10 | 66.17 | −2.18 | −24.95 | 71.17 | −11.89 | −16.78 | 67.46 | 1.43 | −17.98 |
| −5 | 67.225 | −2.33 | −23.55 | 71.64 | −11.19 | −16.32 | 68.03 | 1.04 | −17.64 |
| 0 | 68.90 | −2.50 | −21.50 | 72.32 | −10.02 | −15.82 | 69.04 | 0.13 | −16.87 |
| 5 | 71.37 | −2.69 | −18.36 | 73.39 | −8.34 | −15.06 | 70.61 | −1.26 | −15.80 |
| 10 | 75.18 | −2.98 | −13.60 | 75.08 | −5.57 | −14.02 | 73.11 | −3.31 | −14.30 |
| 15 | 80.92 | −3.49 | −6.64 | 77.79 | −1.62 | −12.30 | 77.08 | −6.47 | −12.33 |
| 20 | 88.97 | −4.18 | 2.61 | 82.20 | 3.83 | −9.44 | 83.05 | −10.79 | −10.24 |
| 25 | 100.78 | −5.30 | 14.68 | 89.15 | 10.40 | −5.14 | 92.42 | −16.34 | −8.23 |
| 30 | 117.52 | −6.56 | 28.06 | 101.32 | 17.56 | 1.39 | 106.66 | −21.91 | −6.70 |
| 35 | 147.35 | −7.63 | 39.33 | 124.77 | 21.64 | 9.80 | 130.95 | −23.80 | −4.38 |
| 40 | 192.56 | −6.34 | 42.63 | 177.73 | 19.76 | 18.91 | 178.55 | −19.55 | 1.44 |

TABLE 5-continued

| Light Receiving | Preparation 8 | | | Preparation 10 | | | Preparation 12 | | |
|---|---|---|---|---|---|---|---|---|---|
| Angle | L | a | b | L | a | b | L | a | b |
| 45 | 21.06 | −5.21 | 39.15 | 203.41 | 15.41 | 22.82 | 213.89 | −14.83 | 5.86 |
| 50 | 201.96 | −6.77 | 42.98 | 186.43 | 18.21 | 22.60 | 184.23 | −17.91 | 0.97 |
| 55 | 159.08 | −9.15 | 39.99 | 138.69 | 18.46 | 17.11 | 139.76 | −21.69 | −7.13 |
| 60 | 129.36 | −9.27 | 31.28 | 111.34 | 15.28 | 10.65 | 115.27 | −21.90 | −12.17 |
| 65 | 115.51 | −8.73 | 22.85 | 100.10 | 11.35 | 5.15 | 102.83 | −20.05 | −14.32 |

TABLE 6

| Light Receiving | Preparation 9 | | | Preparation 11 | | | Preparation 13 | | |
|---|---|---|---|---|---|---|---|---|---|
| Angle | L | a | b | L | a | b | L | a | b |
| −25 | 47.59 | −3.13 | −22.95 | 50.59 | −10.19 | −19.08 | 49.01 | −3.82 | −18.26 |
| −20 | 48.56 | −3.22 | −21.70 | 51.10 | −9.74 | −18.43 | 49.39 | −3.91 | −17.84 |
| −15 | 49.64 | −3.31 | −20.20 | 51.51 | −9.13 | −17.82 | 49.49 | −4.05 | −17.35 |
| −10 | 51.30 | −3.36 | −18.16 | 52.28 | −8.20 | −16.98 | 50.85 | −4.49 | −16.52 |
| −5 | 53.60 | −3.47 | −15.30 | 53.31 | −6.78 | −16.03 | 52.23 | −5.46 | −15.40 |
| 0 | 56.95 | −3.78 | −11.25 | 54.83 | −4.76 | −14.75 | 54.23 | −6.63 | −14.08 |
| 5 | 61.69 | −4.18 | −5.80 | 57.08 | −1.94 | −13.09 | 57.27 | −8.47 | −12.15 |
| 10 | 67.92 | −4.67 | 1.15 | 60.25 | 1.91 | −10.92 | 61.58 | −11.07 | −9.93 |
| 15 | 76.42 | −5.36 | 10.07 | 64.73 | 6.57 | −7.91 | 67.40 | −14.42 | −7.72 |
| 20 | 87.12 | −6.17 | 20.14 | 71.21 | 12.13 | −3.88 | 75.75 | −18.54 | −5.61 |
| 25 | 101.54 | −7.25 | 31.35 | 80.47 | 17.92 | 1.15 | 87.27 | −22.79 | −4.18 |
| 30 | 121.21 | −8.13 | 40.74 | 95.95 | 22.66 | 7.52 | 104.91 | −25.73 | −3.02 |
| 35 | 155.30 | −8.31 | 46.10 | 123.73 | 23.37 | 14.32 | 132.02 | −24.48 | −0.57 |
| 40 | 191.73 | −7.30 | 46.13 | 170.80 | 20.78 | 20.89 | 172.43 | −19.77 | 3.43 |
| 45 | 208.08 | −7.63 | 43.89 | 197.64 | 17.68 | 23.28 | 193.99 | −16.91 | 4.81 |
| 50 | 191.26 | −7.53 | 45.45 | 181.92 | 18.82 | 25.05 | 181.97 | −17.19 | 3.71 |
| 55 | 157.29 | −9.42 | 43.56 | 141.16 | 19.36 | 22.11 | 144.09 | −20.71 | −2.81 |
| 60 | 127.85 | −10.36 | 38.06 | 109.57 | 17.75 | 18.18 | 117.12 | −23.55 | −8.87 |
| 65 | 112.93 | −10.39 | 31.46 | 95.43 | 14.79 | 14.15 | 101.11 | −23.93 | −12.09 |

It is understood from the result that the different color change property is shown when the layer thickness of titanium dioxide is different even if the appearance color is same.

Experiment 6

In general, when a color change of a coated material coated on the substrate according to the observation angle is observed, it is usually observed by rotating the substrate surface without changing light source position and the observation position. It is because lighting or the other light source is fixed in most cases in the case where an observer observe the coated surface of the substrate with holding his hand. It is also because the rotation of the substrate held by hand is easier than changing an observation angle by moving his head. In this measurement embodiment, the sum of the incident angle of irradiation light and the light receiving angle at which the reflected light from the substrate is observed is maintained to be constant since the light source and observation position does not move practically in this condition. In the following, it was studied whether a color change degree of the pleochloism powder is observed sufficiently in the condition that the sum of the incident angle and light receiving angle is maintained to be constant.

Figure 9:
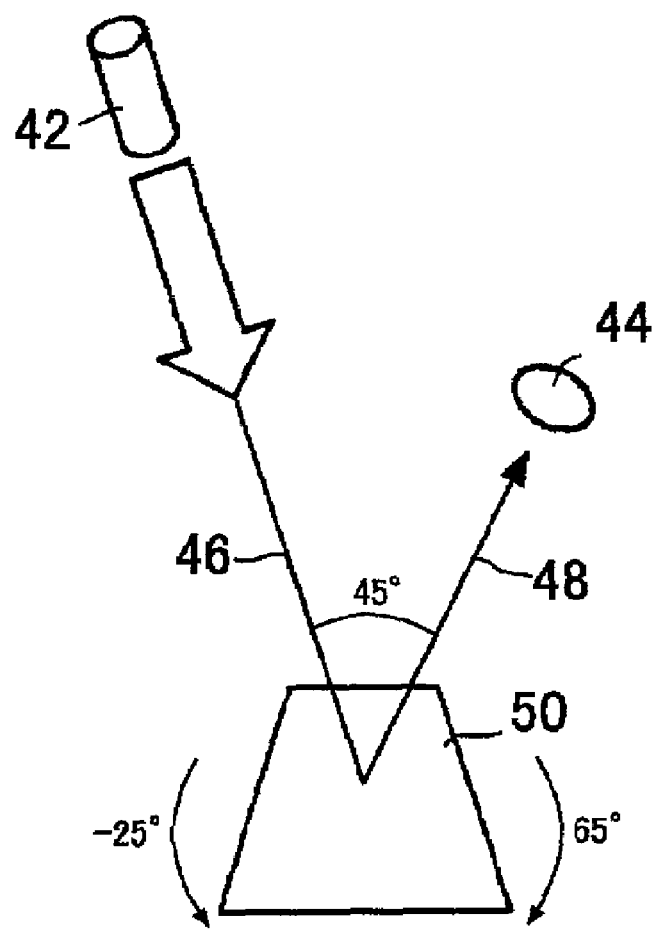
FIG. 9 is an explanatory view showing a summary of the measurement method of Experiment 6.

FIG. 9 is an explanatory view showing a summary of the measurement method of Experiment 6. As shown in FIG. 9, the sum of the angle determined by an optical axis 46 of a white light source 42 and a light-receiving direction axis 48 of a light receiver 44 was fixed to be 45°. A substrate 50 is inclined so as that its angle might be within the range from −25° to 60°. The colorimetry value of the reflected light, which was received by the light receiver 44, converted to Lab of Hunter and the color change degree was measured. Preparations 8 to 13 were used for the measurement.

Figure 10:
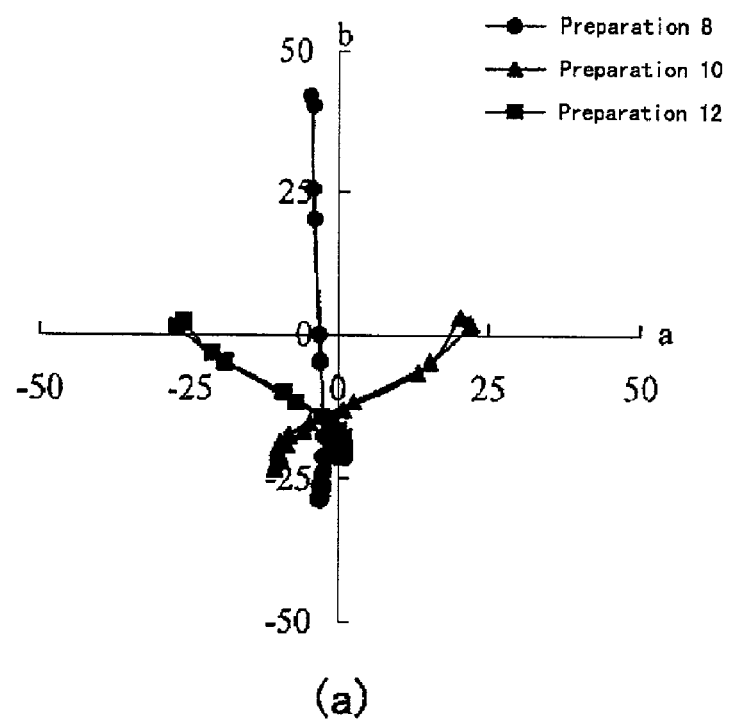
FIGS. 10(a) and (b) are ab views showing the result of Tables 7 and 8, respectively.
Figure 10:
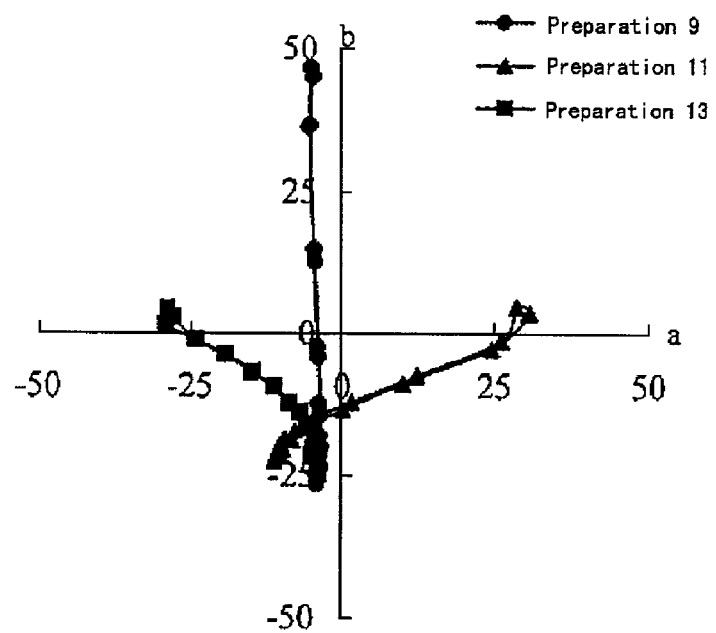

The result of Preparations 8, 10 and 12 whose substrate color is white and the result of Preparations 9, 11 and 13 whose substrate color is gray is shown in Tables 7 and 8, respectively. Also, ab views of Tables 7 and 8 is shown in FIGS. 10(a) and (b), respectively.

TABLE 7

| Light Receiving | Preparation 8 | | | Preparation 10 | | | Preparation 12 | | |
|---|---|---|---|---|---|---|---|---|---|
| Angle | L | a | b | L | a | b | L | a | b |
| −25 | 63.81 | −3.17 | −26.26 | 67.64 | −9.47 | −22.02 | 65.78 | −0.62 | −19.22 |
| −20 | 64.63 | −2.96 | −26.40 | 68.77 | −9.88 | −21.47 | 66.39 | 0.01 | −19.03 |
| −15 | 65.15 | −2.81 | −26.31 | 69.46 | −10.06 | −20.73 | 66.79 | 0.51 | −18.75 |

TABLE 7-continued

| Light Receiving Angle | Preparation 8 | | | Preparation 10 | | | Preparation 12 | | |
| --- | --- | --- | --- | --- | --- | --- | --- | --- | --- |
| | L | a | b | L | a | b | L | a | b |
| −10 | 65.77 | −2.58 | −25.70 | 70.13 | −10.11 | −19.91 | 67.11 | 0.89 | −18.43 |
| −5 | 66.89 | −2.47 | −24.33 | 70.91 | −9.67 | −18.86 | 67.79 | 0.86 | −17.93 |
| 0 | 69.15 | −2.50 | −21.35 | 72.31 | −8.30 | −17.59 | 69.10 | −0.01 | −16.67 |
| 5 | 74.53 | −2.71 | −14.51 | 74.81 | −4.76 | −15.40 | 72.68 | −2.68 | −14.40 |
| 10 | 86.28 | −3.22 | −0.23 | 80.52 | 2.59 | −11.71 | 81.41 | −9.13 | −10.01 |
| 15 | 112.87 | −4.39 | 25.33 | 96.11 | 15.36 | −4.88 | 103.69 | −21.26 | −3.31 |
| 20 | 177.07 | −4.28 | 40.17 | 154.23 | 20.23 | 2.84 | 163.78 | −26.10 | 2.15 |
| 25 | 162.43 | −4.78 | 41.79 | 138.24 | 21.99 | 1.71 | 146.42 | −27.42 | 1.21 |
| 30 | 106.34 | −4.12 | 20.06 | 91.94 | 13.41 | −6.72 | 97.97 | −19.03 | −4.87 |
| 35 | 82.88 | −3.01 | −4.87 | 78.90 | 0.82 | −13.12 | 78.87 | −7.04 | −11.72 |
| 40 | 72.90 | −2.43 | −17.73 | 74.29 | −5.80 | −16.85 | 71.74 | −1.50 | −16.09 |
| 45 | 68.87 | −2.28 | −23.75 | 72.44 | −8.66 | −19.13 | 69.18 | 0.59 | −18.48 |
| 50 | 67.57 | −2.34 | −26.65 | 72.02 | −9.83 | −20.84 | 68.52 | 1.20 | −19.94 |
| 55 | 67.58 | −2.54 | −28.15 | 72.23 | −10.25 | −22.16 | 68.96 | 1.03 | −20.81 |
| 60 | 68.39 | −2.92 | −28.76 | 73.34 | −10.47 | −23.27 | 69.97 | 0.46 | −21.22 |
| 65 | 69.46 | −3.46 | −28.64 | 74.01 | −10.49 | −23.50 | 71.21 | −0.26 | −21.07 |

TABLE 8

| Light Receiving Angle | Preparation 9 | | | Preparation 11 | | | Preparation 13 | | |
| --- | --- | --- | --- | --- | --- | --- | --- | --- | --- |
| | L | a | b | L | a | b | L | a | b |
| −25 | 45.96 | −4.19 | −24.86 | 49.36 | −10.37 | −21.06 | 48.32 | −4.77 | −20.40 |
| −20 | 46.64 | −3.94 | −24.34 | 50.07 | −10.26 | −20.66 | 48.69 | −4.39 | −19.97 |
| −15 | 47.60 | −3.85 | −23.18 | 50.77 | −9.98 | −19.73 | 49.09 | −4.07 | −19.33 |
| −10 | 49.02 | −3.58 | −21.44 | 51.55 | −9.22 | −18.71 | 49.93 | −4.22 | −18.21 |
| −5 | 51.54 | −3.55 | −18.20 | 52.84 | −7.67 | −17.21 | 51.60 | −4.91 | −16.57 |
| 0 | 56.08 | −3.71 | −12.39 | 55.16 | −4.54 | −15.06 | 54.92 | −6.88 | −13.84 |
| 5 | 64.45 | −3.98 | −2.39 | 59.43 | 1.56 | −12.12 | 61.96 | −11.16 | −9.42 |
| 10 | 80.18 | −4.76 | 14.85 | 68.48 | 12.26 | −7.55 | 76.33 | −19.15 | −3.76 |
| 15 | 108.15 | −5.44 | 36.52 | 86.69 | 26.12 | −1.39 | 107.34 | −29.02 | 1.49 |
| 20 | 164.49 | −5.03 | 44.94 | 147.36 | 28.58 | 4.50 | 161.58 | −28.78 | 4.22 |
| 25 | 161.67 | −5.41 | 46.56 | 134.27 | 30.68 | 3.52 | 136.17 | −27.98 | 2.83 |
| 30 | 106.47 | −5.67 | 36.18 | 83.90 | 24.54 | −2.74 | 89.98 | −24.10 | −1.06 |
| 35 | 78.75 | −4.57 | 12.72 | 66.27 | 9.98 | −8.92 | 68.37 | −14.69 | −6.89 |
| 40 | 63.93 | −3.85 | −4.14 | 58.57 | 0.10 | −13.48 | 52.24 | −8.69 | −12.25 |
| 45 | 56.08 | −3.47 | −14.37 | 55.03 | −5.32 | −16.61 | 53.54 | −5.66 | −16.09 |
| 50 | 52.30 | −3.30 | −20.16 | 53.46 | −8.05 | −18.87 | 51.51 | −4.36 | −18.67 |
| 55 | 50.73 | −3.39 | −23.64 | 53.12 | −9.57 | −20.62 | 51.06 | −3.98 | −20.32 |
| 60 | 50.49 | −3.69 | −25.57 | 53.47 | −10.44 | −21.78 | 51.44 | −4.28 | −21.38 |
| 65 | 50.82 | −4.07 | −26.54 | 54.20 | −10.96 | −22.58 | 52.29 | −4.91 | −21.75 |

It is confirmed from the result that the pleochroism powder has great color changing property also in the measurement condition as set forth above.

Experiment 7

Comparative experiment was performed for the pleochroism powder of Example 1 and other materials of Ti, Co and Al oxides. Titanium oxide coated mica (Comparative Example 1), mica coated with cobalt (Comparative Example 2), mica coated with aluminum (Comparative Example 3), titanium oxide coated mica coated with cobalt (Comparative Example 4), titanium oxide coated mica coated with aluminum (Comparative Example 5), and only Ti—Co—Al composite oxide (Comparative Example 6) were used as a comparative object. The amounts of the metals such as titanium dioxide, cobalt and aluminum coated on the surface of mica of these Comparative Examples were adjusted to be the same with those of Example 1.

Comparison method of color tone was as follows. A composition produced by admixing the ingredients shown in Table 9 was used. The composition was coated onto a black paper by a doctor blade so as that the film thickness thereof might be 30 μm. After drying the color paper, light was irradiated from −45° as shown in FIG. 4. The light was observed at −25° and 35° with naked eye. The color change degree were evaluated as follows: color change was favorable: ○ color change was difficult to observe: Δ color was not changed: X.

TABLE 9

| Preparation | 15 wt % |
| --- | --- |
| Nitrocellulose | 10 wt % |
| Butyl Cellosolve | 10 wt % |
| Naphtha | 20 wt % |
| Cyclohexane | 45 wt % |

The results are shown in Table 10.

TABLE 10

|  | Example 1 | Comp. Ex. 1 (TiO$_2$ + Mica) | Comp. Ex. 2 (Co + Mica) | Comp. Ex. 3 (Al + Mica) | Comp. Ex. 4 (Co + Tio$_2$ + Mica) | Comp. Ex. 5 (Al + Tio$_2$ + Mica) | Comp. Ex. 6 (Al + Co + Tio$_2$) |
|---|---|---|---|---|---|---|---|
| −25° Obs. Color | Blue | White | Brown | White | Green | White | Blue |
| 35° Obs. Color | Yellow | Yellow | Brown | White | Yellow | Yellow | Blue |
| Color change degree | ○ | Δ | X | X | Δ | Δ | X |

As is clear from Table 10, the pleochroism powder of Example 1 had different color as compared with the composite oxide that has the same metal ratio, and the composite oxide coated mica that is an intermediate formed in the process of producing the pleochroism powder of the present invention. In particular, though a multi color changing property is not observed practically in the composite oxide coated mica which comprises one or two of the metals such as Ti, Co and Al, a multi color changing property was observed clearly in the pleochroism powder of Example 1. Accordingly, it is understood that the pleochroism powder of the present invention has special color tone and special multi color changing property.

Compounding examples of the present invention are shown in the following. However, the present invention is not restricted thereto. The amount is shown by wt % without otherwise stated.

Compounding Example 1 Gravure Ink

| | |
|---|---|
| Pleochroism Powder of the First Aspect of the Present Invention | 30.0% |
| Ethylene-Vinyl Acetate Copolymer Resin | 7.5 |
| Chlorinated Polypropylene | 5.5 |
| Toluene | 28.0 |
| Ethyl Acetate | 8.5 |
| Methyl Ethyl Ketone | 17.0 |
| Isopropyl Alcohol | 2.5 |
| Polyethylene Wax | 0.8 |
| Antistatic Agent | 0.2 |

Compounding Example 2 Gravure Ink

| | |
|---|---|
| Pleochroism Powder of the First Aspect of the Present Invention | 15.0% |
| Polyamide Resin | 15.0 |
| Rosin Ester | 4.0 |
| Nitrocellulose | 3.0 |
| Isopropyl Alcohol | 46.0 |
| Ethyl Acetate | 5.0 |
| Toluene | 10.0 |
| Polyethylene Wax | 2.0 |

Compounding Example 3 Gravure Ink

| | |
|---|---|
| Pleochroism Powder of the First Aspect of the Present Invention | 20.0% |
| Hardened Rosin | 15.0 |
| Petroleum Resin | 10.0 |
| Toluene | 55.0 |

Compounding Example 4 Gravure Ink

| | |
|---|---|
| Pleochroism Powder of the First Aspect of the Present Invention | 30.0% |
| Nitrocellulose | 10.0 |
| Butyl Cellosolve | 10.0 |
| Naphtha | 25.0 |
| Cyclohexane | 25.0 |

Compounding Example 5 Gravure Ink

| | |
|---|---|
| Pleochroism Powder of the First Aspect of the Present Invention | 14.0% |
| Ethylene-Vinyl Acetate Copolymer Resin | 7.2 |
| Chlorinated Polypropylene | 5.8 |
| Toluene | 58.0 |
| Ethyl Acetate | 11.0 |
| Isopropyl Alcohol | 3.0 |
| Polyethylene Wax | 0.8 |
| Antistatic Agent | 0.2 |

Compounding Example 6 Screen Ink

| | |
|---|---|
| Pleochroism Powder of the First Aspect of the Present Invention | 15.0% |
| Acrylic Resin | 20.0 |
| Naphtha | 35.0 |
| Butyl Cellosolve | 30.0 |

Compounding Example 7 Screen Ink

| | |
|---|---|
| Pleochroism Powder of the First Aspect of the Present Invention | 15.0% |
| Nitrocellulose | 15.0 |
| Cyclohexane | 40.0 |
| Isophorone | 10.0 |
| Naphtha | 10.0 |
| Dibutylphthalate | 10.0 |

Compounding Example 8 Screen Ink

| | |
|---|---|
| Pleochroism Powder of the First Aspect of the Present Invention | 20.0% |
| Nitrocellulose | 20.0 |
| Cyclohexane | 45.0 |
| Isophorone | 10.0 |
| Dioctylphthalate | 5.0 |

Then, the special characteristic that was shown by the pleochroism powder of the second aspect of the present invention was investigated.

Experiment 8

The titanium dioxide coated mica, which generates reflected interference color of a gold color tone, was mixed well with each inorganic pigment shown in Table 11 by using small mill. The admixed amount of each inorganic pigment was 1.0, 2.5, 5.0, 10.0, 25.0, and 50.0 wt % with respect to the amount of the titanium dioxide coated mica. Similarly, the titanium dioxide coated mica, which generates reflected interference color of a gold color tone, was mixed well with each organic pigment and dye shown in Table 11 by using small mill. The admixed amount of each organic pigment and dye was 0.5, 1.0, 3.0, and 10.0 wt % with respect to the amount of the titanium dioxide coated mica. Thus several powder mixtures in which the admixed amount of a pigment or a dye differ each other were obtained. 1 g of the powder mixture was added to 15 g of nitrocellulose lacquer No. 6341™ (produced by Musashi paint Co. Inc.). The mixture was stirred and dispersed by dispersal machine. Thus obtained composition was coated on a hiding power test paper of white-and-black by a doctor blade (thickness of the coated layer: 101 μm) to give the printed article.

The white light was irradiated to the printed article, and the change of the color was observed by visual observation each time the observation angle to the white incident light was changed. Then, a change of hue and a height of chroma was determined. Also, the admixed amount of each pigment and dye in which a change of hue is sufficiently large and a high chroma can be observed was determined.

In all of four kinds of inorganic pigments shown in the following Table 11, the largest change of hue from gold to blue and the highest chroma in visual observation were observed when the admixed amount thereof was 10.0 wt %.

In one organic pigment and two organic dyes shown in following Table 11, in which the admixed amount was 0.5 wt % or 1.0 wt %, showed the biggest change of hue within the range of gold to blue and high chroma in visual observation.

Also, a change of hue and a height of chroma of the printed articles in which 10.0 wt % of inorganic pigment were incorporated in the powder mixture, and 1.0 wt % of organic pigment or dye were incorporated in the mixture, were observed. The results are shown in Table 11. The change of hue and the height of chroma were evaluated as follows: very favorable: ⊙ favorable: ○ normal: Δ bad: X.

pigment was 10.0 wt % with respect to the amount of the titanium dioxide coated mica. Similarly, the titanium dioxide coated mica, which generates reflected interference color of a gold color tone, was mixed well with each organic pigment and dye shown in Table 11 by using small mill. The admixed amount of each organic pigment and dye was 1.0 wt % with respect to the amount of the titanium dioxide coated mica. Thus the powder mixture having pleochroism property was obtained.

Each pleochroism powder was inserted in the cell which was made of fused quartz, and then irradiated by xenon lamp for 30 hours (Illuminance: 285 W/m$^2$, integrated dose about 30 MJ/m$^2$). The color difference was determined by measuring the colors of the powder before and after the light was irradiated by using spectrophotometric colorimeter (CM-1000™: produced by Minolta Camera Co. Inc).

While, 1 g of pleochroism powder prepared with the above method was added to 15 g of nitrocellulose lacquer No. 6341™ (produced by Musashi paint Co. Inc.). The mixture was agitated and was dispersed by dispersal machine. Thus obtained composition was coated on a hiding power test papers of white-and-black by a doctor blade (clearance: 101 μm). The obtained printed article was irra-

TABLE 11

| Used pigment or dye | Color tone | Classification | Admixed amount (wt %) | Change of hue | Height of chroma |
|---|---|---|---|---|---|
| Purussian Blue Formula: FeK[Fe(CN)$_6$] | Blue | Inorganic Pigment | 1.0, 2.5, 5.0, 10.0, 25.0, 50.0 | ○ | Δ |
| Milori Blue Formula: FeK[Fe(CN)$_6$]: 50% + Mica: 50% | Blue | Inorganic Pigment | 1.0, 2.5, 5.0, 10.0, 25.0, 50.0 | ○ | Δ |
| Cobalt Blue Formula: CoAl$_2$O$_4$ | Blue | Inorganic Pigment | 1.0, 2.5, 5.0, 10.0, 25.0, 50.0 | ⊙ | ⊙ |
| Ultramarine Blue Formula: Na$_6$Al$_6$Si$_6$O$_{24}$S$_x$ | Blue | Inorganic Pigment | 1.0, 2.5, 5.0, 10.0, 25.0, 50.0 | ○ | ⊙ |
| Copper Phthalocyanine Blue | Blue | Organic Pigment | 0.50, 1.0, 3.0, 10.0 | ⊙ | ⊙ |
| Brilliant Blue | Blue | Organic Dye | 0.50, 1.0, 3.0, 10.0 | Δ | ○ |
| Quinzarine Green | Blue to Green | Organic Dye | 0.50, 1.0, 3.0, 10.0 | Δ | ○ |

In Table 11, especially excellent result in a change of hue and a height of chroma was obtained when cobalt blue or copper phthalocyanine blue was used.

Experiment 9

Next, light resistance of the pleochroism powder according to the second aspect of the present invention was examined.

The titanium dioxide coated mica, which generates reflected interference color of a gold color tone, was mixed well with each inorganic pigment shown in Table 11 by using small mill. The admixed amount of each inorganic diated by xenon lamp for 30 hours (Illuminance 285 W/m$^2$, integrated dose: about 30 MJ/m$^2$), too. The color difference, which was caused by the light irradiation, was determined by measuring the colors of those printed articles before and after the light was irradiated by using spectrophotometric colorimeter (CM-1000™: produced by Minolta Camera Co. Inc).

Also, a pleochroism powder of the first aspect of the invention and the article coated on the surface with the same were used as comparative example 7.

The measured results of the color difference are shown in table 12.

TABLE 12

| | | | The color difference which was caused by the light irradiation of xenon lamp for 30 hours | | |
|---|---|---|---|---|---|
| Added pigment or dye | | | | Article in which the composition was printed | Article in which the composition was printed |
| Used pigment or dye | Classification | Admixed amount(wt %) | Powder in cell | onto white paper | onto black paper |
| Purussian Blue | Inorganic Pigment | 10.0 | 2.21 | 4.45 | 2.20 |
| Milori Blue | Inorganic Pigment | 10.0 | 3.08 | 3.47 | 1.23 |
| Cobalt Blue | Inorganic Pigment | 10.0 | 0.44 | 3.31 | 0.92 |
| Ultramarine Blue | Inorganic Pigment | 10.0 | 0.56 | 3.13 | 2.00 |
| Copper Phthalocyanine Blue | Organic Pigment | 1.0 | 6.32 | 2.57 | 1.75 |
| Brilliant Blue | Organic Dye | 1.0 | 1.66 | 18.93 | 4.96 |
| Quinzarine Green | Organic Dye | 1.0 | 5.61 | 19.39 | 6.03 |
| Comp. Ex. 7 | — | — | 0.45 | 2.63 | 1.52 |

In table 12, It can be regarded that the observed color of each printed article in which each powder was printed onto white paper, was appearance color of each powder, and the observed color of each printed article in which each powder was printed onto black paper, was color in the condition where the reflected interference color of each pleochroism powder was generated.

As shown in Table 12, the color difference of the powder in which organic pigment or a dye was admixed and article coated with a composition comprising thereof was large. Also, a high light resistance was obtained when cobalt blue was admixed to the powder, which was comparable to the light resistance of comparative example 7, which is the pleochroism powder of the first aspect of the present invention.

From the result of experiment 8 and experiment 9, it is understood that cobalt blue was excellent as a blue pigment to be mixed with titanium dioxide coated mica.

The relationship between admixed amount of cobalt blue and color tone of the pleochroism powder was studied in detail. The titanium dioxide coated mica, which generates reflected interference color of a gold color tone, was mixed well with cobalt blue by using small mill. Several powders in which admixed amount of cobalt blue was varied were made. The admixed amount of cobalt blue was 1.0, 2.5, 5.0, 10.0, 25.0, and 50.0 wt % with respect to the amount of the titanium dioxide coated mica. 1 g of the powder was added to 15 g of nitrocellulose lacquer No. 6341™ (produced by Musashi paint Co. Inc.). The mixture was agitated and was dispersed by dispersal machine. Thus obtained composition was coated on a hiding power test papers of white-and-black by a doctor blade (clearance: 101 μm) to produce a printed article.

The white light was irradiated to the printed article, and the change of color thereof was observed by visual observation each time when the observation angle to the white incident light was changed. Then, a change of hue and a height of chroma of the powder was determined. And the admixed amount of each pigment and dye in which hue can be changed most largely and high chroma can be observed was determined.

The color of the printed article was visually observed. In the case where the printed article in which 1.0 wt % of cobalt blue was admixed, sufficient color changing property could not be observed because blue color appearance thereof was weak. However, the printed article in which cobalt blue was admixed 2.5 wt % or more, showed high color changing property in the range from gold to blue. But the printed article in which cobalt blue was admixed 40 wt % or more, lost the shining property that is special property of pearl agent because blue color appearance thereof was too dark.

Also, the color of the printed article in which the color of base paper was white, was measured by a goniospectrophotometer (produced by Murakami color technology research institute Co. Inc., GCMS-3type GSP-1™). The measurement method is similar to the method used in Experiment 4 and 5. Incident angle of incident white light was set to be 45 degree. The light receiving angles were set to be from −25° to 65° in 5° interval and the value of colorimetry was measured. Then, the value of colorimetry was converted to Lab of Hunter.

Figure 11:
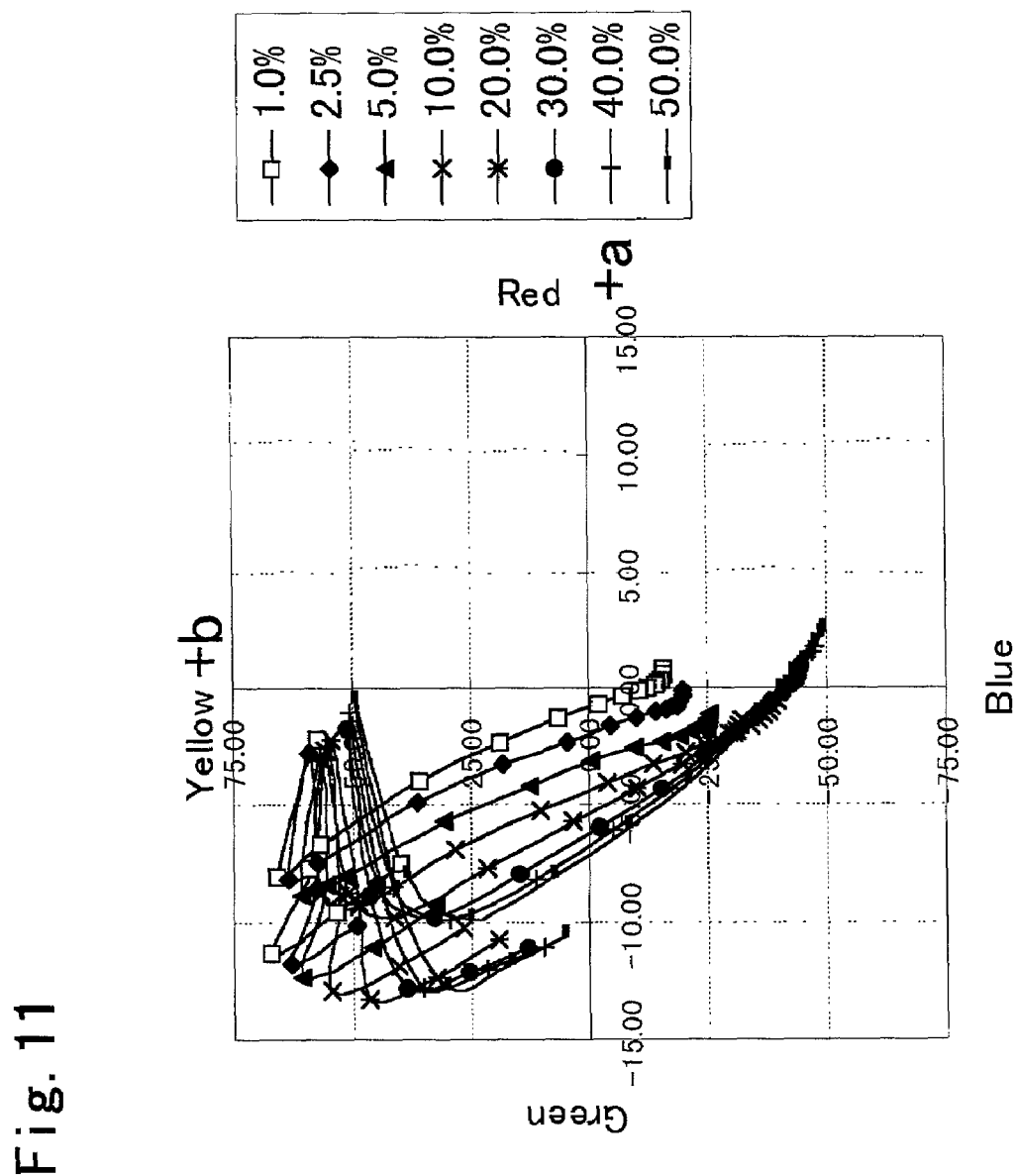
FIG. 11 is a graph showing the relationship between the light-receiving angle and the color change of a pleochroism printed article of the present invention (Tables 13, 14 and 15).
Figure 12:
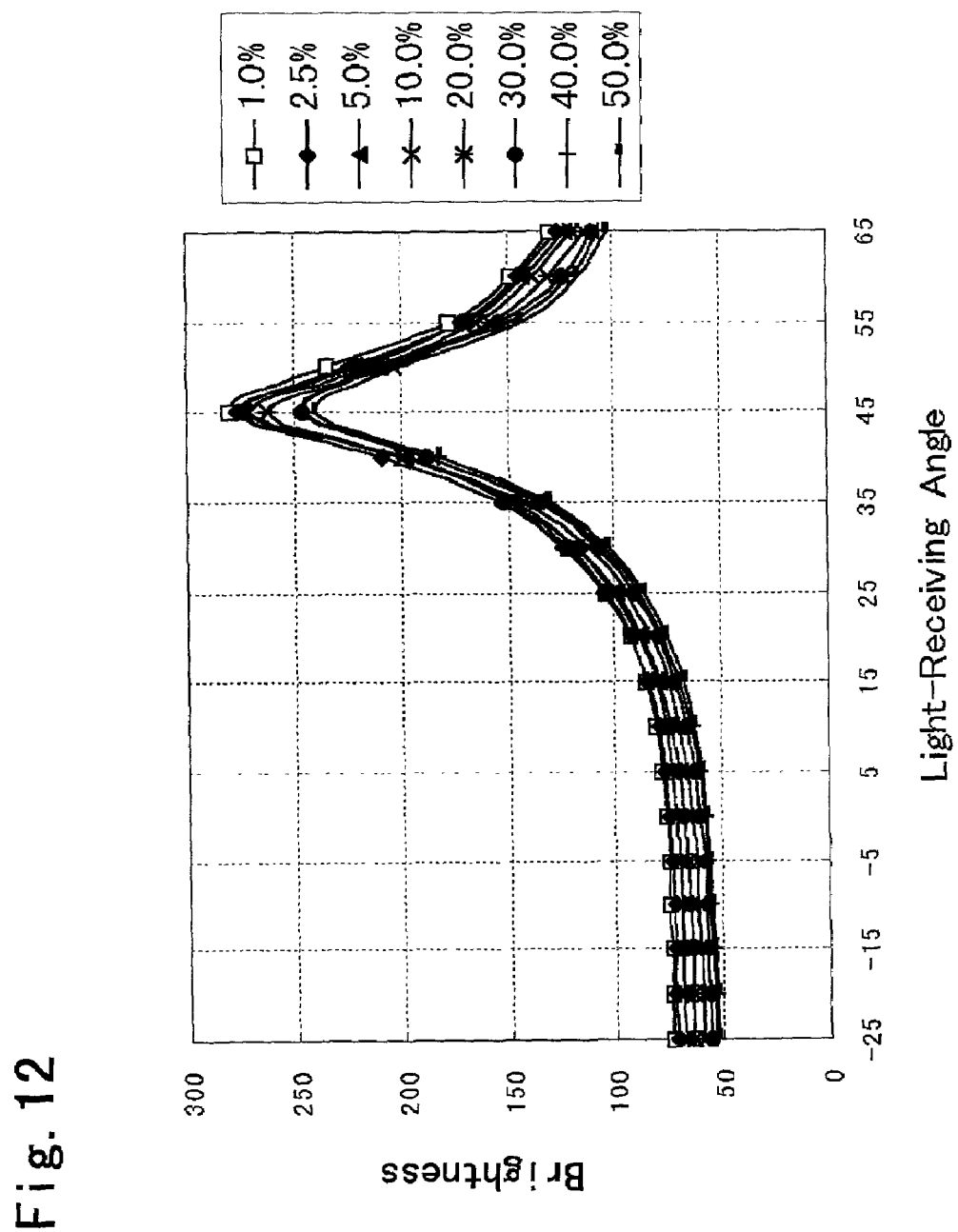
FIG. 12 is a graph of the relationship between the light-receiving angle and the brightness of a pleochroism printed article of the present invention (Tables 13, 14 and 15).

The results are shown in table 13, 14 and 15 in the following. Also, a graph of the relationship between the light receiving angle and the color change of the pleochroism printed article is shown in FIG. 11. And, a graph of the relationship between the light receiving angle and the brightness of the printed article is shown in FIG. 12.

Also, the difference of the values of colorimetry measured at the light receiving angle of −25 degree and +35 degree is shown in Table 16, as color difference (ΔLab), hue difference (Δab), brightness difference (ΔL).

TABLE 13

| Light Receiving Angle | 1.0% | | | 2.5% | | | 5.0% | | |
|---|---|---|---|---|---|---|---|---|---|
| | L | a | b | L | a | b | L | a | b |
| −25 | 73.29 | 0.92 | −15.87 | 71.63 | −0.07 | −20.11 | 68.04 | −1.13 | −25.59 |
| −20 | 73.60 | 0.66 | −15.68 | 71.97 | −0.33 | −19.84 | 68.39 | −1.34 | −25.27 |
| −15 | 73.97 | 0.41 | −15.32 | 72.40 | −0.57 | −19.38 | 68.85 | −1.56 | −24.76 |
| −10 | 74.43 | 0.25 | −14.81 | 72.94 | −0.74 | −18.73 | 69.41 | −1.67 | −24.09 |
| −5 | 75.08 | 0.14 | −14.03 | 73.63 | −0.81 | −17.89 | 70.18 | −1.75 | −23.15 |
| 0 | 76.12 | 0.06 | −12.75 | 74.81 | −0.89 | −16.43 | 71.39 | −1.84 | −21.60 |
| 5 | 77.92 | −0.10 | −10.62 | 76.76 | −1.03 | −14.08 | 73.39 | −1.99 | −19.26 |
| 10 | 80.72 | −0.31 | −7.33 | 79.89 | −1.26 | −10.31 | 76.41 | −2.23 | −15.41 |
| 15 | 85.25 | −0.67 | −2.00 | 84.74 | −1.61 | −4.49 | 81.12 | −2.54 | −9.72 |
| 20 | 92.28 | −1.24 | 6.10 | 92.61 | −2.24 | 4.68 | 88.73 | −3.09 | −0.68 |
| 25 | 103.88 | −2.24 | 18.85 | 104.76 | −3.25 | 18.16 | 100.42 | −4.12 | 12.58 |
| 30 | 120.85 | −3.88 | 35.92 | 123.28 | −4.90 | 36.64 | 118.26 | −5.70 | 30.93 |
| 35 | 148.98 | −6.55 | 56.74 | 153.05 | −7.45 | 57.15 | 146.86 | −7.96 | 51.97 |
| 40 | 197.79 | −7.99 | 65.65 | 208.80 | −8.09 | 63.51 | 198.29 | −8.81 | 60.65 |
| 45 | 279.93 | −2.15 | 57.56 | 276.14 | −2.73 | 59.25 | 272.96 | −3.02 | 57.02 |
| 50 | 234.66 | −7.62 | 59.01 | 218.17 | −8.62 | 58.03 | 223.73 | −8.29 | 55.53 |
| 55 | 177.86 | −11.29 | 66.83 | 172.02 | −11.68 | 63.07 | 170.26 | −12.27 | 60.66 |
| 60 | 147.90 | −9.47 | 53.37 | 144.40 | −10.08 | 49.45 | 141.85 | −11.01 | 46.25 |
| 65 | 129.00 | −7.44 | 40.01 | 126.16 | −8.21 | 36.26 | 123.14 | −9.25 | 32.34 |

TABLE 14

| Light Receiving Angle | 10.0% | | | 20.0% | | | 30.0% | | |
|---|---|---|---|---|---|---|---|---|---|
| | L | a | b | L | a | b | L | a | b |
| −25 | 63.66 | −1.37 | −32.53 | 59.34 | −0.53 | −39.51 | 55.51 | 0.95 | −45.04 |
| −20 | 64.10 | −1.59 | −32.00 | 59.86 | −0.73 | −38.89 | 56.17 | 0.63 | −44.31 |
| −15 | 64.71 | −1.76 | −31.34 | 60.53 | −0.97 | −38.11 | 56.88 | 0.37 | −43.48 |
| −10 | 65.43 | −1.89 | −30.50 | 61.34 | −1.13 | −37.14 | 57.76 | 0.13 | −42.38 |
| −5 | 66.34 | −1.96 | −29.31 | 62.39 | −1.29 | −35.79 | 58.84 | −0.18 | −40.96 |
| 0 | 67.81 | −2.11 | −27.46 | 63.89 | −1.54 | −33.84 | 60.51 | −0.57 | −38.81 |
| 5 | 70.08 | −2.36 | −24.62 | 66.21 | −1.92 | −30.85 | 62.94 | −1.07 | −35.72 |
| 10 | 73.60 | −2.71 | −20.26 | 69.80 | −2.44 | −26.37 | 66.56 | −1.83 | −31.13 |
| 15 | 78.86 | −3.19 | −13.79 | 75.06 | −3.19 | −19.84 | 71.79 | −2.91 | −24.55 |
| 20 | 87.13 | −3.97 | −3.90 | 83.15 | −4.27 | −9.98 | 79.51 | −4.24 | −15.13 |
| 25 | 99.35 | −5.14 | 9.98 | 95.03 | −5.65 | 3.63 | 90.76 | −5.92 | −2.30 |
| 30 | 117.61 | −6.84 | 28.56 | 112.31 | −7.59 | 21.33 | 107.54 | −7.91 | 14.56 |
| 35 | 147.17 | −9.23 | 48.76 | 141.99 | −9.75 | 41.40 | 135.73 | −9.75 | 32.95 |
| 40 | 200.12 | −8.64 | 56.58 | 198.95 | −8.66 | 51.37 | 187.86 | −8.40 | 44.78 |
| 45 | 270.30 | −2.62 | 55.67 | 262.92 | −2.13 | 54.35 | 246.35 | −1.65 | 51.28 |
| 50 | 211.66 | −8.76 | 52.81 | 202.77 | −9.13 | 48.81 | 211.68 | −8.87 | 46.57 |
| 55 | 164.82 | −12.90 | 54.51 | 157.27 | −13.20 | 46.73 | 153.58 | −12.84 | 38.92 |
| 60 | 137.35 | −11.85 | 40.29 | 130.92 | −12.33 | 32.41 | 124.29 | −12.06 | 25.45 |
| 65 | 119.27 | −10.20 | 26.86 | 113.44 | −10.73 | 19.22 | 109.44 | −11.02 | 13.34 |

TABLE 15

| Light Receiving Angle | 40.0% | | | 50.0% | | |
|---|---|---|---|---|---|---|
| | L | a | b | L | a | b |
| −25 | 53.49 | 1.85 | −47.79 | 52.30 | 2.54 | −49.70 |
| −20 | 54.18 | 1.54 | −47.04 | 52.98 | 2.30 | −48.94 |
| −15 | 54.91 | 1.29 | −46.22 | 53.75 | 1.89 | −48.00 |
| −10 | 55.83 | 0.96 | −45.03 | 54.63 | 1.52 | −46.92 |
| −5 | 57.04 | 0.58 | −43.44 | 55.83 | 1.15 | −45.36 |
| 0 | 58.69 | 0.12 | −41.35 | 57.43 | 0.62 | −43.30 |
| 5 | 61.12 | −0.55 | −38.23 | 59.81 | −0.09 | −40.25 |
| 10 | 64.74 | −1.46 | −33.59 | 63.25 | −1.10 | −35.86 |
| 15 | 69.89 | −2.67 | −27.11 | 68.20 | −2.40 | −29.64 |
| 20 | 77.63 | −4.23 | −17.66 | 75.54 | −4.05 | −20.74 |
| 25 | 88.63 | −6.03 | −5.09 | 86.21 | −5.94 | −8.60 |
| 30 | 105.08 | −8.13 | 11.45 | 102.37 | −8.01 | 7.41 |
| 35 | 132.78 | −9.87 | 29.42 | 130.40 | −9.84 | 25.14 |
| 40 | 182.20 | −8.50 | 41.33 | 181.65 | −8.00 | 38.41 |
| 45 | 246.28 | −1.02 | 50.45 | 240.12 | −0.55 | 49.31 |
| 50 | 207.67 | −8.66 | 44.02 | 199.92 | −8.60 | 40.85 |
| 55 | 148.91 | −12.84 | 35.26 | 143.89 | −12.74 | 30.33 |
| 60 | 120.44 | −12.02 | 21.44 | 116.37 | −11.72 | 16.56 |
| 65 | 106.04 | −11.01 | 9.42 | 102.45 | −10.61 | 4.87 |

TABLE 16

| Admixed amount of Cobalt Blue | Light Receiving Angle: −25° | | | Light Receiving Angle: +35° | | | Difference of the value of colorimetry | | |
|---|---|---|---|---|---|---|---|---|---|
| | L | a | b | L | a | b | Δ(Lab): color difference | Δ(L): brightness difference | Δ(ab): hue difference |
| 1.0% | 73.29 | 0.92 | −15.87 | 148.98 | −6.55 | 56.74 | 105.2 | 75.7 | 73.0 |
| 2.5% | 71.63 | −0.07 | −20.11 | 153.05 | −7.45 | 57.15 | 112.5 | 81.4 | 77.6 |
| 5.0% | 68.04 | −1.13 | −25.59 | 146.86 | −7.96 | 51.97 | 110.8 | 78.8 | 77.9 |
| 10.0% | 63.66 | −1.37 | −32.53 | 147.17 | −9.23 | 48.76 | 116.8 | 83.5 | 81.7 |
| 20.0% | 59.34 | −0.53 | −39.51 | 141.99 | −9.75 | 41.40 | 116.0 | 82.7 | 81.4 |
| 30.0% | 55.51 | 0.95 | −45.04 | 135.73 | −9.75 | 32.95 | 112.4 | 80.2 | 78.7 |
| 40.0% | 53.49 | 1.85 | −47.79 | 132.78 | −9.87 | 29.42 | 111.3 | 79.3 | 78.1 |
| 50.0% | 52.30 | 2.54 | −49.70 | 130.40 | −9.84 | 25.14 | 108.9 | 78.1 | 75.9 |

From Table 13, 14, 15, 16 and FIGS. 11, 12, it is understood that the contrast of hue by the change of the observation angle to incident light is large in the case where the admixed amount of cobalt blue is 2.5 to 30.0 wt % with respect to the amount of the titanium dioxide coated mica. Especially, in the case where the admixed amount of cobalt blue was 10.0 to 20.0 wt %, the contrast of hue was large because hue difference and brightness difference was large.

Also, in the case where the other inorganic pigment is used, it is preferable that the admixed amount thereof to the titanium dioxide coated mica is 2.5 to 30.0 wt % with respect to the amount of the titanium dioxide coated mica, especially 10.0 to 20.0 wt %.

What is claimed is:

1. A pleochroism powder which comprises a flaky mica having a coating which consists of two layers:
    wherein one of said two layers is a first layer comprising a metal oxide of titanium coated on said flaky mica and the other is a second layer comprising metal oxides of cobalt and aluminum coated on said first layer.

2. The pleochroism powder according to claim 1, wherein said first layer essentially consists of titanium dioxide.

3. The pleochroism powder according to claim 2, wherein said second layer essentially consists of cobalt aluminate.

4. The pleochroism powder according to claim 3, wherein cobalt titanate is comprised near the interface of said first layer and second layer.

5. The pleochroism powder according to claim 4, wherein said cobalt titanate near the interface of said first layer and second layer is formed by calcinating a composition comprising titanium dioxide coated mica, a cobalt compound and an aluminum compound.

6. The pleochroism powder according to claim 1, wherein a mole ratio of said metal oxides is 50 to 91.5% of titanium dioxide, 7.5 to 49% of cobalt and 1 to 20% of aluminum.

7. The pleochroism powder according to claim 1, wherein a mole ratio of said metal oxides is 50 to 96.5% of titanium dioxide, 2.5 to 7.5% of cobalt and 1 to 47.5% of aluminum.

8. The pleochroism powder according to claim 1, wherein a mole ratio of said metal oxides is 50 to 72.5% of titanium dioxide, 7.5 to 30% of cobalt and 20 to 42.5% of aluminum.

9. The pleochroism powder according to claim 1, wherein a mole ratio of said metal oxides is 50 to 98% of titanium dioxide, 1 to 2.5% of cobalt and 1 to 49% of aluminum.

10. The pleochroism powder according to claim 1, wherein hue of an appearance color of the pleochroism powder is within a range: a: −31.13 to 11.35; b: −29.46 to 31.22; and L: 30.82 to 88.23 wherein L, a, b values are values reported using a standard Hunter L, a, b color scale.

11. A pleochroism printed article comprising a base material and a layer of a composition coated on the surface thereof, said composition comprising the pleochroism powder of claim 1, and wherein different colors of said pleochroism printed article are observed by changing the observation angle of incident light.

12. The pleochroism printed article according to claim 11, wherein said base material has a color included in a set of gray scale colors that ranges from white to black.

13. The pleochroism printed article according to claim 11, wherein said base material has a blue color.

14. The pleochroism printed article according to claim 11, wherein thickness of said layer of the composition is 5 μm or more.

15. A pleochroism printed article comprising a base material, a layer of a first composition coated on the surface of said base material, and a layer of a second composition coated on the surface of said layer of the first composition, said first composition comprising titanium dioxide coated mica which generates a reflected interference color and said second composition comprising a pigment or a dye having substantially complementary color to reflected interference color of said titanium dioxide coated mica, and wherein different colors of said pleochroism printed article are observed by changing the observation angle of incident light.

* * * * *